(12) United States Patent
Hussain

(10) Patent No.: US 9,531,443 B2
(45) Date of Patent: Dec. 27, 2016

(54) TECHNIQUES FOR COMMUNICATION WITH TAG DEVICES

(71) Applicant: INTEL CORPORATION, Santa Clara, CA (US)

(72) Inventor: Jafer Hussain, Montrosa (SG)

(73) Assignee: INTEL CORPORATION, Santa Clara, CA (US)

( * ) Notice: Subject to any disclaimer, the term of this patent is extended or adjusted under 35 U.S.C. 154(b) by 187 days.

(21) Appl. No.: 14/229,853

(22) Filed: Mar. 29, 2014

(65) Prior Publication Data

US 2015/0280789 A1 Oct. 1, 2015

(51) Int. Cl.
*H04B 5/00* (2006.01)

(52) U.S. Cl.
CPC .......... *H04B 5/0037* (2013.01); *H04B 5/0031* (2013.01); *H04B 5/0056* (2013.01); *H04B 5/0081* (2013.01)

(58) Field of Classification Search
None
See application file for complete search history.

(56) References Cited

U.S. PATENT DOCUMENTS

| | | | | |
|---|---|---|---|---|
| 8,225,993 B2* | 7/2012 | Jenkins | .................. | G06Q 40/00 235/379 |
| 2004/0116074 A1* | 6/2004 | Fujii | .................... | G06K 7/0008 455/41.2 |
| 2004/0140884 A1* | 7/2004 | Gallagher, III | .... | G06K 7/10039 340/10.2 |
| 2006/0044113 A1* | 3/2006 | Hashimoto | .......... | G06K 7/0008 340/10.1 |
| 2007/0218837 A1* | 9/2007 | Lessing | .................... | H04B 5/02 455/41.2 |
| 2008/0192721 A1* | 8/2008 | Pernu | ................. | H04W 72/1215 370/345 |
| 2008/0207253 A1* | 8/2008 | Jaakkola | ............... | H04B 17/345 455/550.1 |
| 2008/0253351 A1* | 10/2008 | Pernu | .................. | H04W 52/367 370/345 |
| 2011/0021146 A1* | 1/2011 | Pernu | .................... | H04W 88/06 455/41.2 |
| 2012/0045989 A1* | 2/2012 | Suumaki | ............... | H04W 8/005 455/41.1 |
| 2015/0024683 A1* | 1/2015 | Hussain | ............. | G06K 7/10039 455/41.1 |
| 2015/0278561 A1* | 10/2015 | Do Khac | ........... | G06K 7/10019 455/41.1 |

* cited by examiner

*Primary Examiner* — Zhiyu Lu

(57) ABSTRACT

Various embodiments are generally directed to techniques for resolving interference in near field communications (NFC) among multiple NFC tag devices communicating with a reading device in which one of the tag devices employs a Tag-Talks-First (TTF) protocol while the others use a Request-Response (RR) protocol. An apparatus to communicate with tag devices via near NFC includes a timing component to determine an amount of time remaining in a current sleep pause between two consecutive transmissions of a TTF tag device; and a communications component to determine whether the amount of time remaining in the current sleep pause is sufficient to transmit a request for response to a RR tag device and receive a response to the request from the RR tag device, and to transmit the request based on the amount of time remaining in the current sleep pause. Other embodiments are described and claimed.

20 Claims, 11 Drawing Sheets

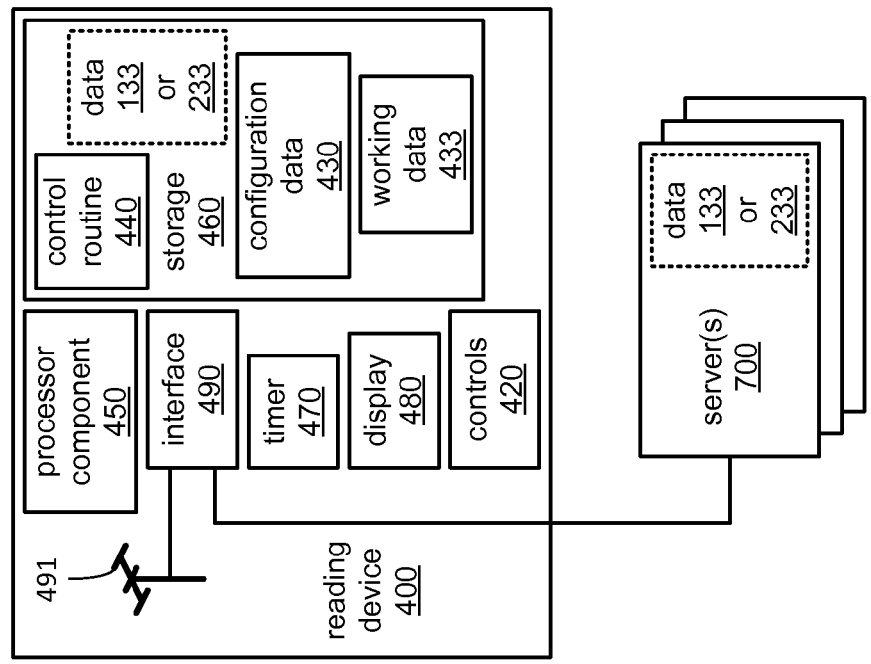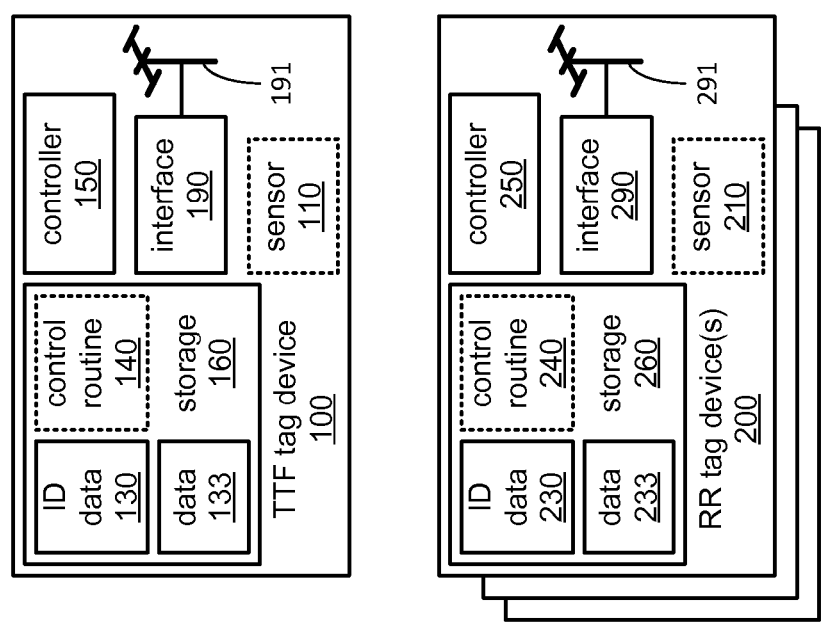
FIG. 2

TECHNIQUES FOR COMMUNICATION WITH TAG DEVICES

BACKGROUND

Tag devices employing near field communication (NFC) technology, such as radio frequency identification (RFID) tags, have become increasingly commonplace in an increasing variety of uses. While originally introduced as an addition to price tags attached to retail store items to combat shoplifting, tag devices now include key fobs for building doors and automobiles, as well as "smart" credit and debit cards.

The growing use of such tag devices has encouraged a proliferation in different implementations of NFC employing different frequencies, encodings, protocols and/or bitrates. This makes difficult any attempt to harmonize implementations to enable interoperability among tag devices and the reading devices they interact with.

More specifically, difficulties arise when multiple tag devices employing different implementations of NFC are simultaneously brought into the vicinity of a reading device. As the reading device generates an electromagnetic field to wirelessly provide electric power to the multiple tag devices, the different protocols and/or timings that each use in their differing implementations of NFC can result in interfering behavior among the multiple tag devices such that communications with the reading device are prevented.

BRIEF DESCRIPTION OF THE DRAWINGS

FIG. 2 illustrates an alternate embodiment of a NFC system.

DETAILED DESCRIPTION

Figure 1:
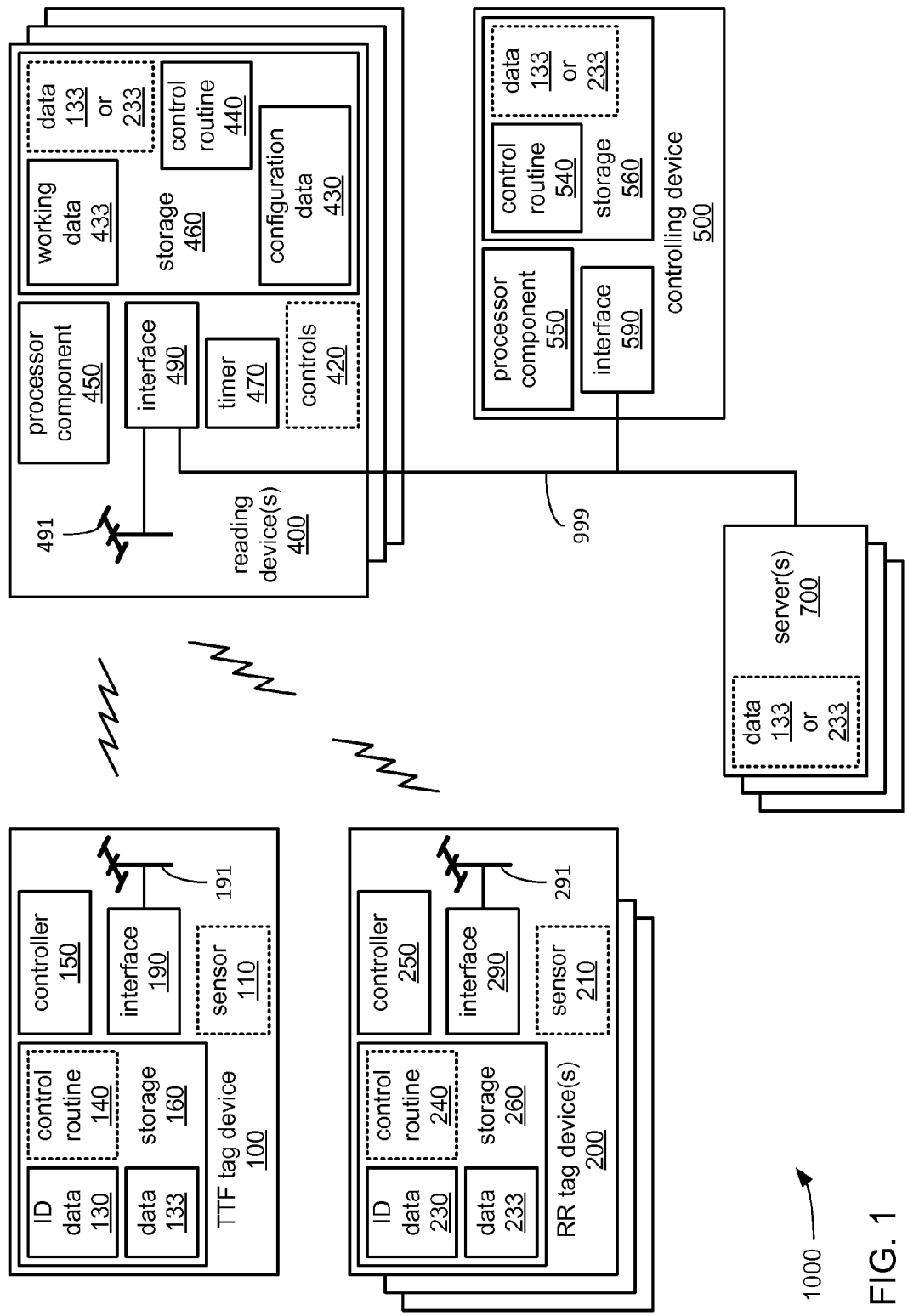
FIG. 1 illustrates an embodiment of a NFC system.

Various embodiments are generally directed to techniques for resolving interference in near field communications among multiple NFC tag devices communicating with a reading device in which one of the tag devices employs a Tag-Talks-First (TTF) protocol while the others use a Request-Response (RR) protocol. While the RR tag devices transmit only in response to a request transmitted by the reading device to do so, the one TTF tag (which has no capability to receive transmissions) device transmits in response to the provision of electrical energy by the reading device without waiting for a request from the reading device to transmit. The reading device employs a recurring sleep interval between consecutive transmissions by the one TTF tag device to locate, identify and communicate with the RR tag devices.

In various situations, a number of tag devices may be kept physically in close proximity to each other (e.g., MasterCard Paypass, Visa payWave, etc., credit or debit cards, and/or TTF contactless cards security identification cards kept together in a wallet), and then occasionally brought into close proximity with a reading device. Such situations may include, and are not limited to, a person carrying a wallet or pocketbook with multiple tag devices in the form of smart credit and/or debit cards that support the use of NFC to exchange data with a NFC reader in support of a transaction (e.g., a purchase of a product or service, withdrawal of money from an account, etc.). As familiar to those skilled in the art, each of those multiple tag devices must be provided with electrical power by the reading device to become capable of communicating with the reading device. The reading device does so wirelessly by generating an electromagnetic field with a selected carrier frequency (e.g., 13.56 MHz) that conveys electric power to tag devices within a relatively short distance of an antenna of the reading device.

One of those tag devices may employ an implementation of NFC using a TTF protocol such as the Kovio NFC protocol originated by Kovio, Inc. of San Jose, Calif., USA (just recently acquired by Thin Film Electronics ASA of Oslo, Norway). As a result, that one TTF tag device may begin transmitting identifying data and/or other data on the selected carrier frequency relatively quickly after beginning to receive electric power from the reading device. One or more of the others of the tag devices may employ an implementation of NFC using a RR protocol such as one or more of NFC-A, NFC-B, NFC-F, etc. promulgated by the NFC Forum of Wakefield, Mass., USA. As a result, the one or more RR tag devices wait to receive communications from the reading device requesting a transmission by one or more of them, and transmit only in response to such requests.

While the one TTF tag device is transmitting, the reading device is unable to transmit such requests for transmission to any of the one or more RR tag devices, because any such transmitted request would be interfered with by the transmissions of the TTF tag device, and therefore, not successfully received by one or more of the RR tag devices. Similarly, while the one TTF tag device is transmitting, any transmission by one of the RR tag devices would also be interfered with.

During the transmissions by the one TTF tag device, the TTF tag device may transmit both identifying data associated exclusively with that TTF tag device and/or whatever data payload is stored within a storage of the TTF tag device. Thus, the one TTF tag device is readily detected and identified by the reading device, and the reading device may be very readily provided with whatever data the one TTF tag device is carrying. Since the one or more RR tag devices do not transmit until they receive a request to do so, the reading device needs to transmit such requests to the RR tag devices to cause the RR devices to transmit to enable the reading device to detect that the RR tag devices are present in the vicinity of the reading device. However, the transmissions of the one TTF tag device interferes with transmissions of such requests by the reading device and/or with transmissions in response to those requests by the one or more RR tag devices.

The one TTF tag device, at least if it adheres to the Kovio NFC protocol, does not transmit continuously throughout the time it is provided with electric power. Instead, it transmits at a regular interval with "sleep pauses" therebetween during which the one TTF tag device does not transmit, at all. The reading device may monitor the transmissions of the one TTF tag device to determine the timing of that interval, including the interval between consecutive instances of the one TTF tag device beginning to transmit and/or the duration of the sleep pauses between consecutive transmissions by the one TTF tag device. Thus, the reading device is able to predict when the one TTF tag device will next begin transmitting again.

The reading device uses the sleep pauses of the one TTF tag device to transmit requests for transmissions to the one or more RR tag devices and to receive the transmissions made by the one or more RR tag devices in response to those requests. The reading device stores working data concerning communications underway with the one or more RR tag devices to enable continuing those communications across multiple sleep pauses. For each request that is to be transmitted by the reading device, the reading device determines whether sufficient time remains during each sleep pause to both transmit the request and receive the response thereto. If there isn't sufficient time, then the reading device defers transmitting that request until a subsequent sleep pause. Further, if the reading device determines that it is not possible to transmit a particular request and receive the associated response within any sleep pause, then the reading device may provide an indication of a need to remove the one TTF tag from the vicinity of the reading device to unencumber communications with the one or more RR tags.

The reading device makes various transmissions and awaits the reception of various transmissions to determine whether RR tag devices employing one or more types of NFC encoding are present and/or to identify RR tag devices employing each of the one or more types of NFC encoding. In so doing, the transmissions made by the reading device may include a request for all RR tag devices employing a particular type of encoding to respond with transmissions to enable the reading device to discover them. If multiple RR tag devices employing the same type of encoding are present within the vicinity of the reading device, then multiple transmissions by the reading device interspersed with the reception of multiple transmission by different ones of those multiple RR tag devices may be required as part of an anti-collision protocol to enable the reading device to identify all of those multiple RR tag devices.

However, before making and awaiting such transmissions to determine what RR tag device are present, the reading device first awaits any transmissions by any TTF tag devices for at least a predetermined period of time after electromagnetically providing electric power to tag devices within the vicinity of its antenna. If no such transmission of a TTF tag device is detected during the predetermined period of time, then the reading device determines that no TTF tag devices are present and commences attempting to detect the presence of RR tag devices in its vicinity with only the timing of responses of RR tag devices to accommodate in timing transmissions to RR tag devices. However, if such a transmission of a TTF tag device is detected during the predetermined period of time, then the reading device determines that a TTF tag device is present, determines the timing of its sleep pauses, and commences attempting to detect the presence of RR tag devices in its vicinity during those sleep pauses.

In some embodiments, the reading device may seek only RR tag devices employing a specific type of NFC encoding. This may occur where the reading device is employed in providing security authorization and/or performing transactions where only a specific set of RR tag devices are accepted, and therefore, only tag devices within that specific set are sought out. Thus, where a TTF tag device is detected, the occurrences of its sleep pauses may be used to locate and communicate only with a RR tag device of that specific set, and the transmissions of the TTF tag device may be ignored beyond determining their timing. In other embodiments, the reading device may seek to identify all tag devices within its vicinity, including TTF tag devices and/or RR tag devices employing multiple types of NFC encoding. This may occur where the reading device is employed in performing transactions where any of a variety of tag devices are accepted.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a NFC system 1000 incorporating one or more of a TTF tag device 100, one or more RR tag devices 200, one or more reading devices 400, a controlling device 500 and one or more servers 700. The one or more reading devices 400 and the controlling device 500 of the NFC system 1000 may be operated together in a variety of different configurations and under a variety of different circumstances. By way of example, the one or more reading devices 400 and the controlling device 500 may be installed within a retail store with each of the one or more reading devices 400 stationed at a checkout counter. Alternatively, the one or more reading devices 400 and the controlling device 500 may be installed within a building or other structure, or among multiple buildings and/or other structures (e.g., a campus) to control access thereto with each of the one or more reading devices stationed at a door or other form of access. The TTF tag device 100 and the one or more tag devices 200 may each take on any of a variety of physical forms intended for any of a variety of purposes. By way of example, the TTF tag device 100 and/or the one or more tag devices 200 may each be a smart card carried in a wallet, purse, etc. of a person seeking to conduct a transaction at the retail store or make entry into the building or other structure.

For example, upon approaching one of the reading devices 400, a patron of a retail store may physically tap the wallet, a digit of a hand, etc. on a portion of that reading device 400 to initiate communications between the reading device 400 and one or more of the tag devices 100 and/or 200 to complete a purchase of an item. Upon being triggered to initiate such communications, the reading device 400 may generate an electromagnetic field to convey electric power to ones of the tag devices 100 and/or 200. The reading device 400 may then await a predetermined period of time before making transmissions to receive a transmission from the TTF tag device 100 as part of determining whether the TTF tag device 100 is present.

If no transmission is received from the TTF tag device 100 during the predetermined period of time, then the reading device 400 determines that there must not be a TTF tag device present. The reading device 400 then commences transmitting requests for any of the RR tag devices 200 employing various types of NFC encoding to respond as part of detecting and identifying any of the RR tag devices 200 that may be present. However, if a transmission is received from the TTF tag device 100 during the predetermined period of time, then the reading device 400 determines that the TTF tag device 100 is present. The reading device 400 then makes and receives transmissions to detect and identify at least one of the RR tag devices 200 that may be present during sleep pauses occurring between consecutive transmissions made by the TTF tag device 100.

In some embodiments, the reading device 400 may be configured to seek out a particular one of the tag devices 100 and/or 200 with which to exchange data to in support of a transaction, such as making a purchase or authentication of a person to unlock a door. In such embodiments, the reading device 400 may not transmit requests for responses from tag devices that do not employ types of NFC encoding other than the type employed by one or more particular tag devices that it seeks. In other embodiments, the reading device 400 may be configured to seek out ones of the tag devices 100 and/or 200 that employ any of a variety of types of NFC encoding. In such embodiments, the reading device 400 may transmit requests using various types of NFC encoding in an effort to detect tag devices employing each of those various types of NFC encoding.

Following detection and identification of one of the tag devices 100 and/or 200 appropriate for whatever purpose (e.g., completing a purchase or performing authentication), the reading device 400 may convey data retrieved from that one of the tag devices 100 and/or 200 to one or more servers 700. In so doing, the data may be relayed to the one or more servers 700 through the controlling device 500 that may be so interposed to control operation of the one or more reading devices 400, provide encryption for secure communications with the one or more servers 700, etc.

Depending on the purpose of the communications between the reading device 400 and the one or more tag devices 100 and/or 200, the data exchanged therebetween and relayed to the one or more servers 700 may include any of a variety of types of information required for the particular purpose. By way of example, such information may include one or more pieces of personally identifiable information (e.g., name, address, account number, etc.), a randomly generated security code, an indication of level of security clearance, an indication of type of account, etc.

FIG. 2 illustrates a block diagram of an alternate embodiment of the NFC system 1000. The NFC system 1000 of FIG. 2 is similar to the NFC system 1000 of FIG. 1 in numerous ways such that corresponding items are designated with corresponding reference numerals. The NFC system 1000 of FIG. 2 differs from that of FIG. 1 inasmuch as the NFC system 1000 of FIG. 2 incorporates only one reading device 400 and does not incorporate the controlling device 500. In the NFC system 1000 of FIG. 2, the reading device 400 may be operated in a variety of different configurations and under a variety of different circumstances. The reading device 400 may be smartphone or other portable device carried by a person who operates it to interact with the tag devices 100 and/or 200.

The TTF tag device 100 and the one or more tag devices 200 may each take on any of a variety of physical forms intended for any of a variety of purposes. The TTF tag device 100 and the one or more tag devices 200 may each be a smart card carried in a wallet, purse, etc. by that person to conduct a transaction such as an online purchase of goods or services. Upon being operated by that person to begin interaction with the tag devices 100 and/or 200, the reading device 400 may generate an electromagnetic field to convey electric power to the tag devices 100 and/or 200. The reading device 400 may then await the predetermined period of time to detect a transmission from the TTF tag device 100 and proceed with detecting and identifying the one or more RR tag devices 200 as has been previously described.

Referring to both FIGS. 1 and 2, each of these devices 100, 200, 400, 500 and 700 may be any of a variety of types of computing device, including without limitation, a desktop computer system, a data entry terminal, a laptop computer, a netbook computer, a tablet computer, a handheld personal data assistant, a smartphone, smart glasses, a smart wristwatch, a digital camera, a smart card incorporating a processor component, a body-worn computing device incorporated into clothing, a computing device integrated into a vehicle (e.g., a car, a bicycle, a wheelchair, etc.), a server, a cluster of servers, a server farm, etc.

As depicted, these computing devices 100, 200, 400, 500 and 700 exchange signals conveying data required to establish near field communications thereamong, and to support performance of a transaction (e.g., a financial transaction, a monetary transaction, an authentication transaction, etc.). Among at least the computing devices 400, 500 and/or 700, such exchanges may occur through a network 999. However, one or more of these computing devices may exchange other data entirely unrelated to the use of NFC to support a transaction with each other and/or with still other computing devices (not shown) via the network 999. In various embodiments, the network 999 may be a single network possibly limited to extending within a single building or other relatively limited area, a combination of connected networks possibly extending a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the TTF tag device 100 incorporates one or more of a controller 150, a storage 160, a sensor 110, and an interface 190 accompanied by an antenna 191 to enable the TTF tag device 100 to receive electric power via an electromagnetic field and to engage in near field communications. The storage 160 stores one or more of a control routine 140, identification (ID) data 130 and data 133. The ID data 130 may include a unique identifier associated with the TTF tag device 100, itself, and/or with a person who uses it. The data 133 may include a data payload to be transmitted by the TTF tag device 100 in response to being provided with electric power via an electromagnetic field. Again, being a TTF (Tag-Talks-First) device, the TTF tag device 100 begins transmitting on a recurring basis in response simply to the provision of electric power, continues to do so as long as electric power is provided, and does so with sleep pauses between transmissions. The TTF tag device 100 may not incorporate any component capable of receiving transmissions to control its recurring transmissions, and therefore, may not stop its recurring transmissions except if electric power ceases to be provided.

In some embodiments, the controller 150 may incorporate a relatively simple sequencer, microcontroller or other logic implemented as digital circuitry to recurringly transmit the ID data 130 and/or the data 133 at a regular interval in response to receiving electric power conveyed by a reading device (e.g., the reading device 400). In such embodiments, the data 133 may include one or more of personal information (e.g., name, address, etc.), account information (e.g., an account number or passcode), an indication of a service level (e.g., a so-called "gold" or "platinum" membership status, or a security clearance level), etc.

In other embodiments, the controller 150 may incorporate a processor component capable of executing a sequence of instructions, such as the control routine 140. In such embodiments, the control routine 140 incorporates a sequence of instructions operative on the processor component of the controller 150 to implement logic to perform various functions. Among such functions may be to randomly generate a one-time-password (OTP), one-use-only account number, etc. Alternatively or additionally, among such functions may be to digitally sign data provided by a reading device (e.g., the reading device 400) and to transmit the resulting signature back to the reading device as part of an authentication and/or encryption system.

In still other embodiments that incorporate the sensor 110, the controller 150 (regardless of its implementation) may retrieve readings from the sensor 110 and the data 133 may include indications of measures or other inputs from the sensor 110. Such indications may be recorded over a period of time preceding near field communications with the reading device 400 and/or may represent currently detected information. The sensor 110 may be any of a variety of types of sensor configured to detect any of a variety of environmental or other characteristics, including and not limited to, temperature, humidity, vibration, pressure, acceleration, orientation relative to gravity, etc.

Figure 3:
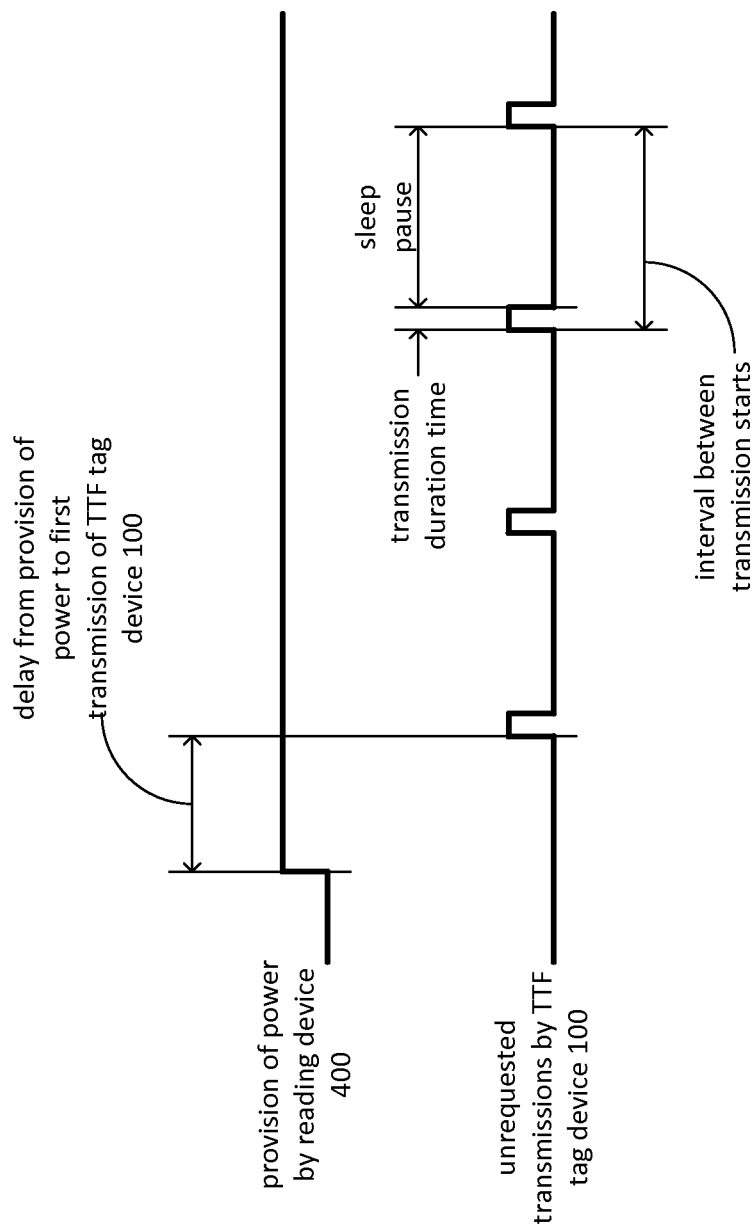
FIGS. 3, 4 and 5 each illustrate an embodiment of near field communications involving a tag device.

FIG. 3 depicts an embodiment of the near field communications behavior of the TTF tag device 100 as effected by the controller 150 operating the interface 190. After a delay from the start of provision of electric power by the reading device 400, the controller 150 may operate the interface 190 to transmit a combination of the ID data 130 and the data 133 in a relatively short transmission occurring at a regular interval. In embodiments in which the TTF tag device 100 implements Kovio type NFC, each transmission by the TTF tag device 100 may be 128 bits in length transmitted at 106 kilobits/sec over approximately 9.44 microseconds. Further, the length of each sleep pause may be approximately 3.6 milliseconds. The TTF tag device 100 may begin these recurring transmissions less than 1 millisecond after being wirelessly provided with electric power by the reading device 400.

Returning to FIGS. 1 and 2, in various embodiments, each of the one or more RR tag devices 200 incorporates one or more of a controller 250, a storage 260, a sensor 210, and an interface 290 accompanied by an antenna 291 to enable each of the one or more RR tag devices 200 to receive electric power via an electromagnetic field and to engage in near field communications. The storage 260 stores one or more of a control routine 240, ID data 230 and data 233. The ID data 230 of each RR tag device 200 (not unlike the ID data 130) may include a unique identifier of the RR tag device 200, itself, and/or with a person who uses it. The data 233 of each RR tag device 200 (not unlike the data 133) may include a data payload to be transmitted by the RR tag device 200 in response to being provided with electric power via an electromagnetic field. Again, being a RR (Response-Request) device, the RR tag device(s) 200 transmit in response to a transmission conveying a command that requests for them to do so. Thus, the transmissions made by the RR tag device(s) 200 are responses to requests from a reading device to transmit.

In some embodiments, the controller 250 may incorporate a relatively simple sequencer, microcontroller or other logic implemented as digital circuitry to transmit the ID data 230 and/or the data 233 in response to a request received from a reading device (e.g., the reading device 400) to do so. In such embodiments, the data 233 may include one or more of personal information, account information, an indication of a service level, etc.

In other embodiments, the controller 250 may incorporate a processor component capable of executing a sequence of instructions, such as the control routine 240. In such embodiments, the control routine 240 incorporates a sequence of instructions operative on the processor component of the controller 250 to implement logic to perform various functions. Among such functions may be to randomly generate an OTP, etc., or to digitally sign data provided by a reading device (e.g., the reading device 400).

In still other embodiments that incorporate the sensor 210, the controller 250 (regardless of its implementation) may retrieve readings from the sensor 210 and the data 233 may include indications of measures or other inputs from the sensor 210. Such indications may be recorded over a period of time preceding near field communications with the reading device 400 and/or may represent currently detected information. The sensor 210 may be any of a variety of types of sensor configured to detect any of a variety of environmental or other characteristics.

Figure 4:
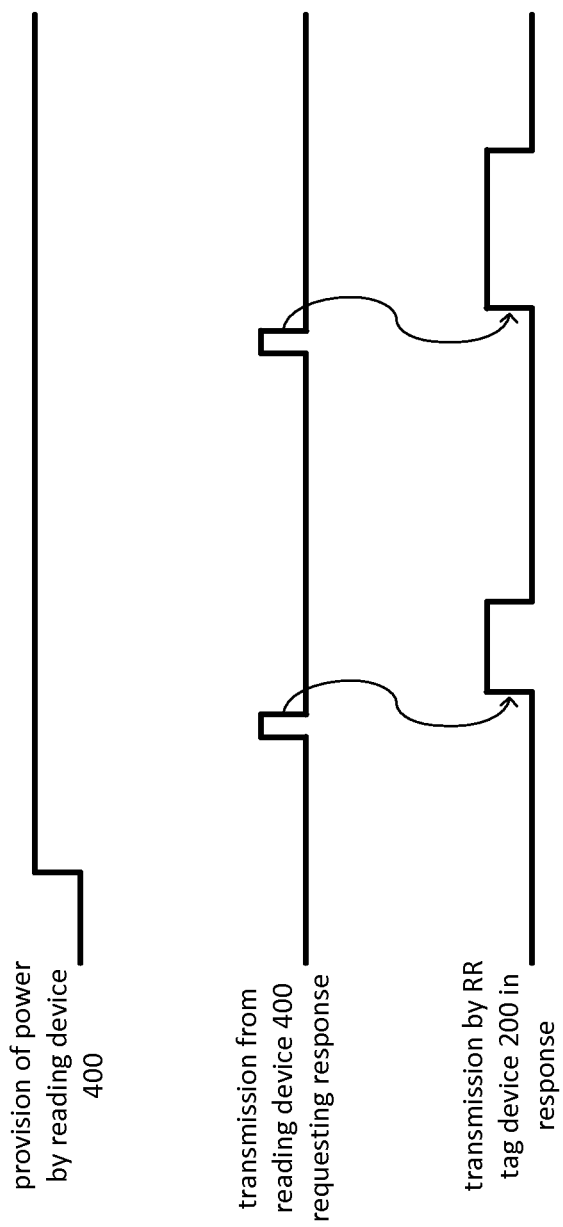

FIG. 4 depicts an embodiment of the near field communications behavior of one of the RR tag devices 200 as effected by the controller 250 operating the interface 290. In some embodiments, one or more of the RR tag devices 200 may implement NFC adhering to one or more of the versions of the NFC specification promulgated by the NFC Forum, such as NFC-A, NFC-B or NFC-F. Therefore, transmissions between the reading device 400 and/or one or more of the RR tag devices 250 may be any of a variety of bits in length transmitted at any of a variety of bitrates, and may last any of a variety of periods of time depending on which of those and/or other versions are used. Despite these differences, a common feature of those different versions is that the tag devices are RR tag devices that transmit only in response to a request from a reading device to do so. Thus, the controller 250 would operate the interface 290 to transmit the ID data 230, the data 233 and/or other information only in response to requests for such transmissions made by the reading device 400.

Returning to FIGS. 1 and 2, in various embodiments, the reading device 400 incorporates one or more of a processor component 450, a storage 460, a timer 470, controls 420, a display 480 and an interface 490 to couple the reading device 400 to the network 999. The interface 490 may be accompanied by an antenna 491 to also couple the reading device 400 to the tag devices 100 and/or 200. Specifically, the interface 490 and the antenna 491 may cooperate to enable the reading device to provide electric power via an electromagnetic field to various tag devices (e.g., the tag devices 100 and/or 200) and to engage in near field communications therewith. The storage 460 stores one or more of a control routine 440, the data 133 and/or 233, configuration data 430 and working data 433. The configuration data 430 may include indications of parameters controlling the detection of and interaction with different tag devices employing different types of near field communications by the reading device 400, which may include what NFC types are supported. The working data 433 may include indications of the state of communications between the reading device and one or more of the tag devices 100 and/or 200 to enable resumption of those communications following instances in which those communications are interrupted.

The control routine 440 incorporates a sequence of instructions operative on the processor component 450 in its role as a main processor component of the reading device 400 to implement logic to perform various functions. In executing the control routine 440, the processor component 450 may monitor the controls 420 for an indication of operation of the reading device 400 to initiate near field communications with one or more tag devices. In some embodiments, such operation may be a physical tapping of a portion of the reading device 400 monitored by or otherwise associated with the controls 420 (e.g., a portion of a casing of the reading device 400) such as commonly occurs when a user of a smart card incorporating a tag device physically taps a portion of a reading device with a portion of the smart card to conduct a transaction. By way of example, the controls 420 may incorporate a sensor of any of a variety of types to detect such physical tapping. In other embodiments, such operation of the controls 420 may be manual operation of a button, switch, dial, touch-screen interface, etc. to more explicitly initiate near field communications between the reading device 400 and one or more of the tag devices 100 and/or 200. In such other embodiments, the processor component 450 may operate the controls 420 and the display 480 to provide a user interface that enables such manual operation.

Upon being triggered to initiate near field communications, the processor component 450 operates the interface 490 to generate an electromagnetic field to convey electric power to tag devices within a relatively short distance of the antenna 491 (e.g., the tag devices 100 and/or 200). As familiar to those skilled in the art, such a short distance may be a few centimeters to a foot or two feet from the antenna 491, depending on various factors including and not limited to the strength of the electromagnetic field generated, the shape of the antenna 491, the size of the antenna 491, the frequency of the electromagnetic field, etc. Following the start of generating that electromagnetic field, the processor component 450 waits for at least a predetermined period of time before operating the interface 490 to make transmissions as part of engaging in near field communications. Instead, during the predetermined period of time, the processor component 450 operates the interface 490 to monitor for any transmissions from TTF tag devices, such as the TTF tag device 100. The length of the predetermined period of time, as well as what radio frequency or frequencies to monitor may be retrieved by the processor component 450 from the configuration data 430.

If no transmission of a TTF tag device was detected (e.g., the TTF tag device 100 is not present), the processor component 450 may operate the interface 490 to begin detecting RR tag devices (e.g., one or more of the RR tag devices 200). Specifically, the processor component 450 may configure the interface 490 with a radio frequency, bitrate and/or encoding appropriate to a specific type of NFC. The processor component 450 may then operate the interface 490 to transmit one or more requests for RR tag devices employing that radio frequency, bitrate and/or encoding to respond with a transmission indicating their presence in the vicinity of the reading device 400 (more specifically, in relatively close distance to the antenna 491).

In some embodiments, the configuration data 430 may indicate to the processor component 450 a single specific NFC type that the processor component 450 is to attempt to communicate with. Such an indication in the configuration data 430 may include indications of a specific radio frequency, a specific bitrate and/or a specific encoding employed by that specific NFC type. The configuration data 430 may also provide an indication of an expected length in bits of one or more types of responses from RR tag devices employing that specific type of NFC. Such configuration of the reading device 400 to detect only RR tag devices of a specific NFC type may be occur in embodiments in which the reading device 400 is intended to interact with a relatively small set of RR tag devices (e.g., RR tag devices employed as security devices to authenticate persons for entry through doors, etc.).

In such embodiments, the processor component 450 may operate the interface 490 to detect ones of the RR tag devices 200 that employ the single specific type of NFC. In some embodiments one or more of the RR tag devices 200 may employ one of the types of NFC promulgated by the NFC Forum, such as NFC-A, NFC-B or NFC-F, each of which is differentiated from the others by differences in encoding, bitrate and/or length (in bits) of transmissions made by RR tag devices in response to requests from a reading device. Thus, the processor component 450 may seek only ones of the RR tag devices 200 that employ one of these specific NFC types promulgated by the NFC Forum. Detection of one of the RR tag devices 200 may entail the processor component 450 operating the interface 490 to transmit a request for a response from any RR tag device 200 employing a particular type of NFC. The processor component 450 then operates the interface 490 to await a response from any RR tag device 200 that supports that NFC type. If what appears to be a transmission from such a RR tag device 200 is received, then the processor component 450 may analyze the transmission to determine if it conveys a number of bits with an encoding and/or other features (e.g., a cyclic redundancy check, etc.) expected in a transmission from a RR tag device supporting that NFC type.

If the processor component 450 detects only one RR tag device 200 that employs the specific NFC type sought by the processor component 450, then the processor component 450 may simply commence near field communications with that RR tag device 200 to exchange payload data (e.g., the data 233), etc. However, if the processor component 450 detects more than one RR tag device 200 that employs the specific NFC type sought by the processor component 450, then the processor component 450 may exchange multiple transmissions with those RR tag devices 200 to obtain unique identifiers from each (e.g., the receive the ID data 230 from each). The processor component 450 may do this as part of anti-collision protocol to establish coordination among transmissions made by each of those RR tag devices 200 to prevent interference among those transmissions. Each NFC type may have associated with it a specific anti-collision protocol employing any of a variety of techniques to effect such coordination. Once such coordination is established, and depending on the type of transaction supported by the reading device 400 and one or more of the RR tag devices 200, the processor component 450 may commence near field communications with a specific one of the RR tag devices 200 or more than one of the RR tag devices 200, exchanging payload data (e.g., the data 233), etc.

In other embodiments, the configuration data 430 may indicate to the processor component 450 multiple specific NFC types that the processor component 450 is to attempt to communicate with. Such configuration of the reading device 400 to detect RR tag devices employing any of multiple specified NFC types may occur in embodiments in which the reading device 400 is intended to interact with a wide variety of RR tag devices (e.g., RR tag devices incorporated into smart credit cards or smart debit cards issued by multiple institutions to support performing various financial transactions).

In such embodiments, the processor component 450 may operate the interface 490 to detect ones of the RR tag devices 200 that are within a relatively close distance to the antenna 491 and that employ each of the specified multiple types of NFC, configuring the interface 490 with characteristics associated with each of those specified types. Following the detection of any of the RR tag devices 200 that employ one of the specified NFC types, the processor component 450 may operate the interface to identify each of the detected tags. In so doing, the processor component 450 may operate the interface 490 to perform whatever anti-collision protocol is required for each of the specified types of NFC for which more than one RR tag device 200 was detected. Upon identifying all of the RR tag devices 200 supporting each of the specified types, the processor component 450 may commence near field communications with one or more of those RR tag devices 200 in support of whatever transaction is to be performed (e.g., communications to exchange the payload data 233 carried by one or more of those RR tag devices 200).

Thus, in such embodiments, the processor component 450 may first operate the interface 490 to detect any RR tag device 200 supporting any of the specified types of NFC before operating the interface 490 to identify any of the detected RR tag devices 200 and/or to perform any anti-collision protocol. However, in such embodiments, the processor component 450 may, instead, operate the interface 490 to detect any RR tag devices 200 supporting one of the specified NFC types, and then operate the interface 490 to identify all of the RR tag devices 200 supporting that NFC type and/or to perform an anti-collision protocol associated with that NFC type, before operating the interface 490 to detect any RR tag devices 200 supporting another of the specified NFC types. Stated differently, where the reading device 400 is configured to support near field communications with RR tag devices employing any of multiple types of NFC, the detection and identification of RR tag devices associated with each NFC type may be performed in any of various orders. Further, the configuration data 430 may provide an indication of what order of detection and identification is to be followed.

However, if a transmission is received from a TTF tag device 100 during the predetermined period of time after the processor component 450 operates the interface 490 to generate the electromagnetic field to convey electric power, then the processor component 450 may analyze the transmission to confirm it is a transmission from a TTF tag device. Specifically, the processor component may analyze the transmission to determine whether it conveys a number of bits with an encoding and/or other features (e.g., a cyclic redundancy check, etc.) expected in a transmission from a TTF tag device. If the determination is made that the transmission is from a TTF tag device (specifically, the TTF tag device 100), then the processor component 450 may continue to operate the interface 490 to continue monitoring the transmissions of the TTF tag device 100 to determine timing characteristics of its transmissions, including the interval at which it recurringly begins transmitting and the duration of its sleep pause. Upon determining such timing characteristics, the processor component 450 may configure the timer 470 to become synchronized to the timings of the transmissions of the TTF tag device 100 to enable the timer 470 to at least provide an indication of when the TTF tag device 100 will next begin to transmit.

Such configuration of the timer 470 enables the processor component 450 to be provided with an indication of how much time remains during each sleep pause of the TTF tag device 100 as the processor component 450 uses those sleep pauses to engage in near field communications with one or more of the RR tag devices 200 without interference from the transmissions of the TTF tag device 100. The processor component 450 may operate the interface 490 to detect the cessation of each transmission by the TTF tag device 100 such that the processor component 450 may detect the beginning of each sleep pause of the TTF tag device 100. Alternatively, the processor component 450 may rely on indications from the timer 470 of when each sleep pause begins.

Thus, having determined that the TTF tag device 100 is present, and having determined the timing characteristics of the sleep pauses that occur between consecutive transmissions of the TTF tag device 100, the processor component 450 may operate the interface 490 to exchange transmissions with the one or more RR tag devices 200 as needed during those sleep pauses to detect one or more of the RR tag devices 200 as previously described. More specifically, during the sleep pauses, the processor component 450 may operate the interface 490 to transmit requests for responses either from RR tag devices 200 employing only one specific NFC type or from RR tag devices 200 that employing any of multiple specific NFC types. Again, in some embodiments, the processor component 450 may engage in all exchanges needed to detect RR tag devices 200 before engaging in further exchanges to identify them. Alternatively, in other embodiments, the processor component 450 may engage in both detection and identification of RR tag devices 200 of one specific NFC type before proceeding to engaging in both detection and identification of RR tag devices 200 of another specific NFC type.

In making use of the sleep pauses between consecutive transmissions of the TTF tag device 100 to exchange transmissions with one or more of the RR tag devices 200, the processor component 450 may repeatedly employ indications from the timer 470 of time remaining in each sleep pause before the start of the next transmission by the TTF tag device 100. More specifically, before each transmission that the processor component 450 is about to make, the processor component 450 may determine whether sufficient time remains in a current sleep pause to both make that transmission and receive the expected response from one of the RR tag devices 200. As familiar to those skilled in the art, the lengths of transmissions made by tag devices in response to transmissions of requests for those responses from a reading device are usually specified as part of a specification for various types of NFC that may be employed by tag devices.

Thus, the amount of time required for one of the RR tag devices 200 to transmit a particular response to a particular request transmitted by the reading device 400 may be known and may be used by the processor component 450 to determine whether sufficient time remains in a current sleep pause to allow one of the RR tag devices 200 to transmit a response before the next transmission by the TTF tag device 100 begins. If sufficient time does remain during a current sleep pause, then the processor component 450 proceeds with operating the interface 490 to transmit that request and then operates the interface 490 to receive the expected transmission made in response to the request. However, if there is insufficient time remaining during a current sleep pause, then the processor component 450 delays operating the interface 490 to transmit that request until the next sleep pause begins.

Additionally, where the processor component 450 determines that there is insufficient time for one particular combination of request to transmit and response to receive, the processor component 450 may select a different combination of request to transmit and response to receive for which the time remaining may be sufficient. It may be that the time required to transmit the response in the latter combination is significantly shorter than in the first combination. Thus, the processor component 450 may engage in reordering its transmissions of requests based on how much time remains in each sleep pause.

Regardless of whether the processor component 450 reorders requests to transmit, the processor component 450 may store information concerning near field communications underway with one or more of the tag devices 100 and/or 200 as the working data 433. By way of example, queues of requests yet to be transmitted to one or more of the tag devices 100 and/or 200 may be maintained therein. Alternatively or additionally, where receiving information from one of the tag devices 100 and/or 200 requires assembling pieces of that information from multiple responses transmitted therefrom in response to multiple transmitted requests of the reading device 400, those pieces may be gathered and assembled as part of the working data 433 as they are received. In particular, such gathering and storage may be performed where the requests and responses thereto must be exchanged with a particular one of the RR tag devices 200 across multiple sleep pauses and/or where those requests and responses thereto must be interleaved with entirely unrelated transmissions associated with others of the RR tag devices 200.

Figure 5:
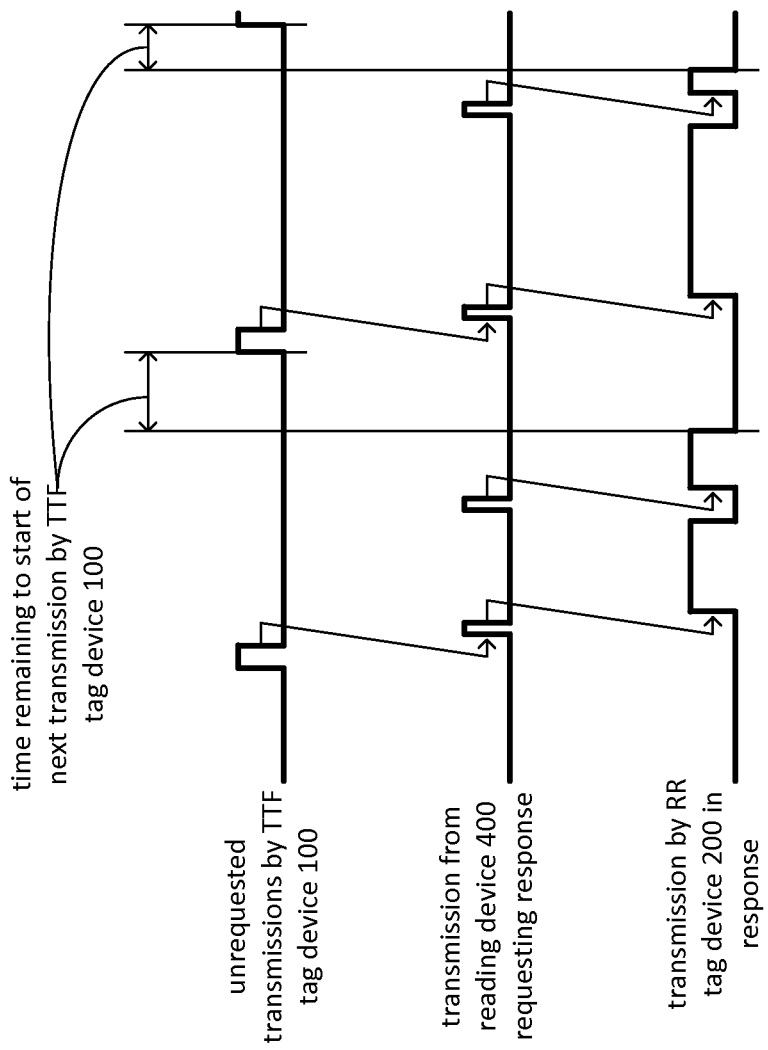

FIG. 5 depicts an embodiment of coordination of transmissions among the reading device 400, the TTF tag device 100 and one of the RR tag devices 200 as effected by the processor component 450. As depicted, the TTF tag device 100 recurringly makes transmissions without prompting by any request at regular intervals separated by sleep pauses. As has been discussed, following the cessation of each such transmission by the TTF tag device, thus bringing about the start of each such sleep pause, the processor component 450 may use each sleep pause to transmit at least one request to one or more of the RR tag devices 200. Following each such transmitted request made by the processor component 450, the processor component 450 awaits and receives a response to that request from a RR tag device 200. Following the receipt of each such response by a RR tag device 200, the processor component 450 may transmit another request and await another response thereto if the processor component 450 determines that there is sufficient time remaining before the end of the current sleep pause to do so.

Again, these requests from the processor component 450 and the responses thereto from one or more of the RR tag devices 200 may be transmitted as part performing detection of one or more RR tag devices 200, performing identification of one or more RR tag devices 200 (e.g., requesting and receiving ID data 230), performing an anti-collision protocol, and/or exchanging payload data (e.g., the data 233). Also again, the processor component 450 may select from among multiple combinations of requests to transmit and responses to receive thereto based on the amount of time remaining before the end of each sleep pause. Thus, the processor component 450 may reorganize an order of requests to be made during detection, identification, anti-collision and/or data exchanges where sufficient time remains to accommodate one combination of transmitted request and received response thereto, but not another.

Returning to FIGS. 1 and 2, if transmissions are received from more than one TTF tag device (e.g., the TTF tag device 100 and one or more others) during the predetermined period of time after the processor component 450 operates the interface 490 to generate the electromagnetic field to convey electric power, then the processor component 450 may operate the display 480 and/or another component of the reading device 400 to provide an audible and/or visual indication to an operator of the need to separate the one tag device 100 or 200 that the operator intends to use from the others. Alternatively or additionally, the processor component 450 may operate the display 480 and/or another component of the reading device 400 to provide a similar indication if there is at least one of the RR tag devices 200 that employs a type of NFC in which there is one or more combinations of transmitted request and a response thereto for which there will never be sufficient time to complete within any sleep pause. Following the provision of such an indication to an operator of the reading device 400, the processor component 450 may await an indication of operation of the controls 420 or another form of indication from the operator that the one tag device 100 or 200 that the operator intends to use has been separated from other tag devices such that it is the only tag device within a relatively close distance to the reading device 400 (or more precisely, within relatively close distance to the antenna 491).

Following detection and identification of one of the tag devices 100 and/or 200 appropriate for whatever purpose (e.g., completing a purchase or performing authentication), the reading device 400 may convey data retrieved from that one of the tag devices 100 and/or 200 to one or more servers 700. In so doing, the data may be relayed to the one or more servers 700 through the controlling device 500 that may be so interposed to control operation of the one or more reading devices 400, to provide encryption for secure communications with the one or more servers 700, etc.

Depending on the purpose of the near field communications between the reading device 400 and the one or more tag devices 100 and/or 200, the data exchanged therebetween and relayed to the one or more servers 700 may include any of a variety of types of information required for the particular purpose. By way of example, such information may include one or more of personally identifiable information (e.g., name, address, account number, etc.), a randomly generated security code, an indication of level of security clearance, an indication of type of account, etc.

In various embodiments, each of the processor components 450 and 550, and/or the controllers 150 and 250 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, each of the storages 160, 260, 460 and 560 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, at least a portion of each of the interfaces 190, 290, 490 and 590 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 6:
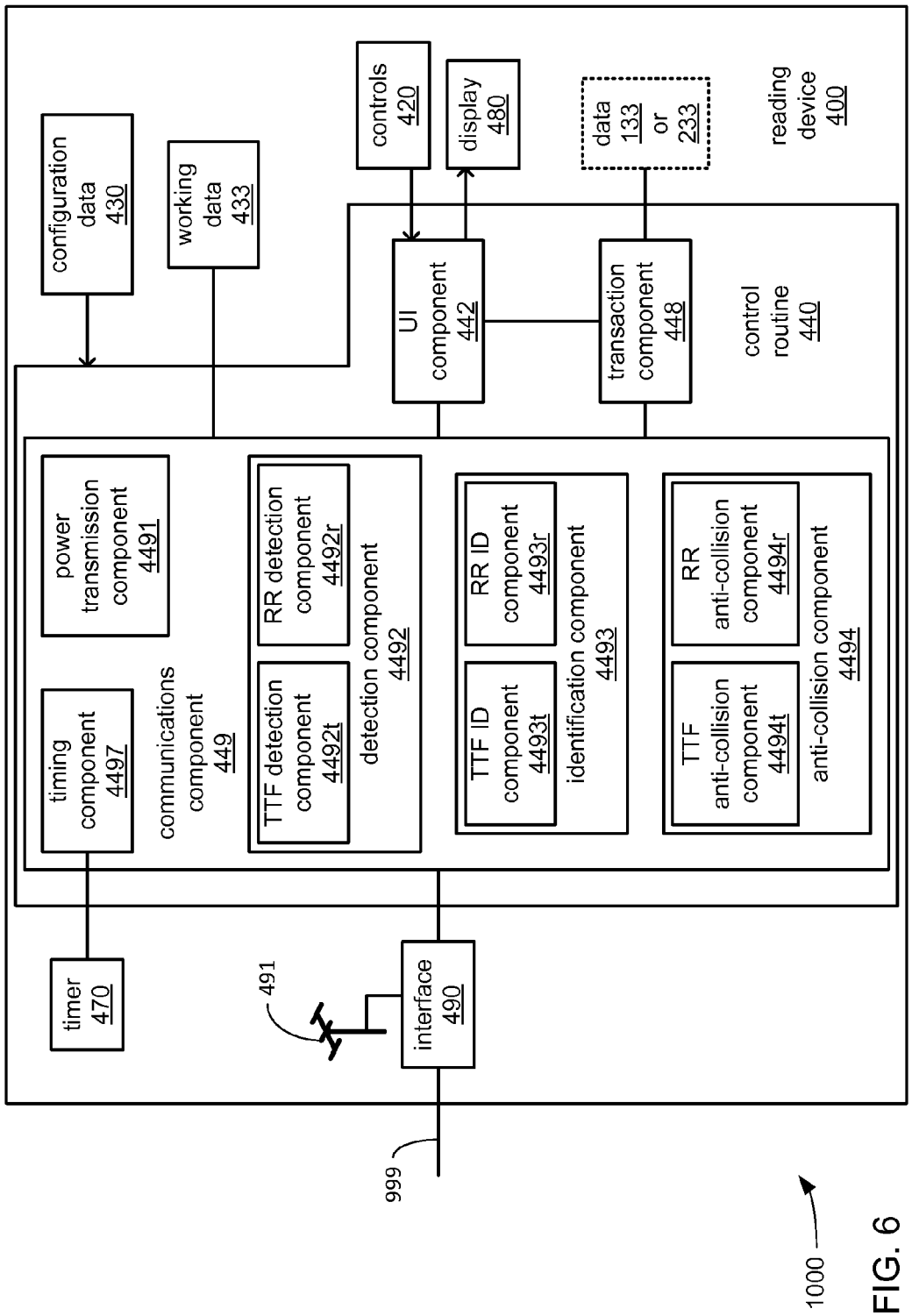
FIG. 6 illustrates a portion of an embodiment.

FIG. 6 illustrates a block diagram of a portion of an embodiment of the NFC system 1000 of either FIG. 1 or FIG. 2 in greater detail. More specifically, FIG. 6 depicts aspects of the operating environment of the reading device 400 in which the processor component 450 engages in near field communications to detected, identify and exchange data with one or more tag devices. As recognizable to those skilled in the art, the control routine 440, including the components of which it is composed, are selected to be operative on whatever type of processor or processors that are selected to implement the processor component 450.

In various embodiments, the control routine 440 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processor component 450. Where one or more device drivers are included, those device drivers may provide support for any of a variety of other components, whether hardware or software components, of the reading device 400.

The control routine 440 may include a user interface (UI) component 442 executable by the processor component 450 to monitor the controls 420 for an indication of operation of the controls 420 to convey a command to engage in near field communications. As previously discussed, the controls 420 may include any of a variety of switches, knobs, buttons, etc. to be manually operated to convey such a command. However, as has also been previously discussed, the controls 420 may include any of a variety of sensors disposed about a casing of the reading device 400 to detect a tap or other physical engagement with the casing by an operator's digits (e.g., fingers or a thumb) or by a wallet, etc. to convey such a command.

The control routine 440 may include a communications component 449 executable by the processor component 450 to operate the interface 490 to transmit and receive signals via the network 999 as has been described. Among the signals transmitted and/or received may be signals conveying the data 133 and/or 233 among one or more of the computing devices 400, 500 or 700 via the network 999. As will be recognized by those skilled in the art, the communications component 449 is selected to be operable with whatever type of interface technology is selected to implement the interface 490.

However, as depicted, the communications component 449 may alternatively or additionally be executable by the processor component to operate the interface 490 to engage in near field communications with one or more of the tag devices 100 and/or 200. The communications component 449 may, as depicted, incorporate one or more of a power transmission component 4491, a detection component 4492, an identification component 4493, an anti-collision component 4494 and a timing component 4497. In executing the communications component 449, the processor component 450 may execute one or more of the components 4491, 4492, 4493, 4494 or 4497.

The power transmission component 4491 may, in response to operation of the controls 420 detected by the UI component 442 (e.g., operation thereof to convey a command to engage in NFC communications), operate the interface 490 to generate an electromagnetic field to convey electric power to one or more tag devices. As previously discussed, electric power is conveyed in this manner to tag devices within a relatively close proximity to the antenna 491 (e.g., within the range of about 1 foot).

The detection component 4492 may include a TTF detection component 4492t to operate the interface 490 await receipt of a transmission from a TTF tag device, such as the TTF tag device 100. As previously discussed, the interface 490 may be so operated for a predetermined period of time following operation of the interface 490 to wirelessly provide electric power to tag devices within the vicinity of the antenna 491. Upon receiving a transmission that may be from a TTF tag device, the TTF detection component 4492t may analyze the transmission to determine whether it has various characteristics expected of a transmission from a TTF tag device (e.g., a particular encoding, a particular bitrate, a particular quantity of bits, a particular form of error correction, etc.).

If the TTF detection component 4492t determines that no TTF tag device is present, then exchanges of transmission with RR tag devices (e.g., one or more of the RR tag devices 200) may proceed without needing to be timed to accommodate transmissions of a TTF tag device. As previously discussed, such exchanges of transmissions include exchanges of transmissions to detect RR tag devices, exchanges of transmissions to identify individual RR tag devices, exchanges of transmissions to implement an anti-collision protocol among RR tag devices and exchanges of transmissions to exchange data with RR tag devices.

However, if the TTF detection component 4492t determines that a TTF tag device is present, then exchanges of transmissions with RR tag devices may need to be restricted to occurring only during sleep pauses between consecutive transmissions made by the detected TTF tag device. To assist in timing exchanges of transmissions with RR tag devices to occur during such sleep pauses, the timing component 4497 may operate the interface 490 to monitor the timings of the transmissions of the detected TTF tag device to determine the interval at which those transmissions occur and/or the timing of when each sleep pause comes to an end. The timing component 4497 may configure the timer 470 with timing settings matched to the timings of the transmissions of the detected TTF tag device to enable the timer 470 to at least provide an indication of how much time remains before a current sleep pause ends.

The detection component 4492 may also include a RR detection component 4492r to operate the interface 490 to transmit, to one or more RR tag devices that may be within the vicinity of the antenna 491, requests for transmissions from such RR tag devices to enable detection of their presence. The RR detection component 4492r may then operate the interface 490 to await receipt of transmission(s) from one or more RR tag devices, such as the RR tag device(s) 200. As just discussed, where the TTF detection component 4492t does not detect a TTF tag device in the vicinity of the antenna 491, such exchanges of transmissions engaged in by the RR detection component 4492r to detect RR tag devices may proceed unencumbered by occurrences of transmissions by a TTF tag device. However, if the TTF detection component 4492t does so detect a TTF tag device, then the RR detection component 4492r may need to cooperate with the timing component 4497 to restrict such exchanges of transmissions to occurring within the sleep pauses between consecutive ones of the transmissions made by a detected TTF tag device.

The identification (ID) component 4493 may include a TTF ID component 4493t to identify a detected TTF tag device if a TTF tag device is determined to be present by the TTF detection component 4492t. The TTF ID component 4493t may operate the interface 490 to receive one or more transmissions from a detected TTF tag device, and then analyze the one or more transmissions to retrieve identifying information of the detected TTF tag device (e.g., the ID data 130) therefrom.

The identification (ID) component 4493 may also include a RR ID component 4493r to operate the interface 490 to identify one or more RR tag devices that may be detected by the RR detection component 4492r. The RR ID component 4493r may operate the interface 490 to receive one or more transmissions from the one or more RR tag devices (if there are any), and then analyze the one or more transmission to retrieve identifying information of the one or more RR tag devices (e.g., the ID data 230) therefrom. Again, where the TTF detection component 4492t does not detect a TTF tag device in the vicinity of the antenna 491, such exchanges of transmissions engaged in by the RR ID component 4493r to identify one or more RR tag devices may proceed unencumbered by occurrences of transmissions by a TTF tag device. However, if the TTF detection component 4492t does so detect a TTF tag device, then the RR ID component 4493r may need to cooperate with the timing component 4497 to restrict such exchanges of transmissions to occurring within the sleep pauses between consecutive ones of the transmissions made by a detected TTF tag device.

The anti-collision component 4494 may include a TTF anti-collision component 4494t to address collisions in transmissions between two or more detected TTF tag devices if two or more TTF tag devices are determined to be present by the TTF detection component 4492t. Where two or more TTF tag devices are so detected, then the TTF anti-collision component 4494t may cooperate with the UI component 442 to operate the display 480 and/or another component of the reading device 400 to present an indication to an operator of the reading device 400 to separate the tag device they intend to use with the reading device 400 from others. The TTF anti-collision component 4494t may then await an indication from the UI component 442 that the operator has provided an indication that such separating of tag devices has been done. In response to such an indication from the operator, the TTF anti-collision component 4494t may then signal the detection component 4492 to repeat the detection of tag devices.

The anti-collision component 4494 may also include a RR anti-collision component 4494r to address collisions in transmissions between two or more detected RR tag devices if two or more RR tag devices are determined to be present by the RR detection component 4493t. Where two or more RR tag devices are so detected, then the RR anti-collision component 4494r may operate the interface 490 to exchange transmissions with the two or more RR tag devices in an anti-collision protocol to resolve collisions that may occur among transmissions made by different RR tag devices in responding to requests transmitted by the reading device 400. As previously discussed, different implementations of NFC communications, including different NFC types promulgated by the NFC Forum, may specify particular anti-collision protocols to be used. Once again, where the TTF detection component 4492*t* does not detect a TTF tag device in the vicinity of the antenna 491, such exchanges of transmissions engaged in by the RR anti-collision component 4494*r* to resolve collisions in transmissions among two or more RR tag devices may proceed unencumbered by occurrences of transmissions by a TTF tag device. However, if the TTF detection component 4492*t* does so detect a TTF tag device, then the RR anti-collision component 4493*r* may need to cooperate with the timing component 4497 to restrict such exchanges of transmissions to occurring within the sleep pauses between consecutive ones of the transmissions made by a detected TTF tag device.

Following detection and identification of any tag devices in close proximity to the antenna 491, and following resolution of any collisions of transmissions thereamong, the transaction component 448 may cooperate with the communications component 449 to exchange payload data (e.g., the data 133 and/or 233) between the reading device 400 and one or more of the detected tag device(s) in support of a transaction. Again, the transaction may be any of a variety of financial, monetary, authentication or other type of transaction. Also, the data 133 and/or 233 may be any of a variety of types of data including, and not limited to, personally identifiable data, authentication codes, digitally signed data, account identifiers, indications of service level or security clearance level, etc.

Figure 7:
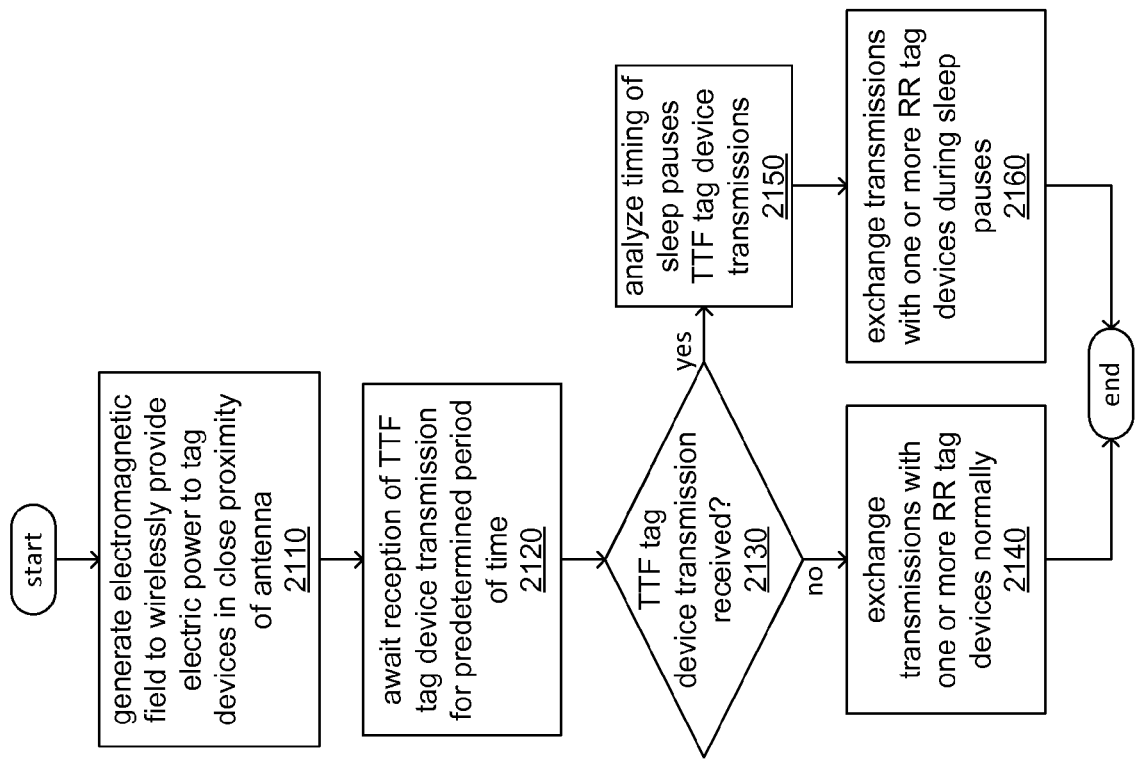
FIGS. 7-10 each illustrate a logic flow according to an embodiment.

FIG. 7 illustrates an embodiment of a logic flow 2100. The logic flow 2100 may be representative of some or all of the operations executed by one or more embodiments described herein. More specifically, the logic flow 2100 may illustrate operations performed by the processor component 450 in executing at least the control routine 440, and/or performed by other component(s) of one of the reading devices 400. In particular, the logic flow 2100 provides a high-level overview of operations to address the possibility of a TTF tag device being present.

At 2110, a processor component of a reading device (e.g., the processor component 450 of the reading device 400) operates an interface of the reading device (e.g., the interface 490) to generate an electromagnetic field to wirelessly provide electric power to tag devices in close proximity to an antenna of the reading device (e.g., the antenna 491). As previously discussed, the distance from the antenna within which the tag devices would have to present to be in close enough proximity may be a few centimeters to about a foot. This distance could vary among embodiments based, at least in part, on the strength of the electromagnetic field generated and/or the physical shape or size of the antenna.

At 2120, the reading device waits for a predetermined period of time for any response from any TTF tag device (e.g., the TTF tag device 100) that may be within the close proximity to the antenna. As has been discussed, the processor component of the reading device may configure the interface with various characteristics of the type of NFC expected to be employed by a TTF tag device that may be within that close proximity (e.g., the characteristics for Kovio type NFC promulgated by Kovio, Inc., now Thin Film Electronics).

At 2130, a check is made as to whether a transmission has been received of the type expected from a TTF tag device during the predetermined period of time. As has been explained, in determining whether a TTF tag device transmission has been received, a received transmission may be analyzed to determine if it has characteristics expected of a TTF tag device transmission, such as an expected frequency, an expected bitrate, an expected length of what is transmitted (e.g., an expected number of bits), an expected encoding, etc.

If no such transmission is received during the predetermined period of time, then the reading device exchanges transmissions with one or more RR tag devices (e.g., the one or more RR tag devices 200) that may be within the close proximity to the antenna normally at 2140 (e.g., without being encumbered by interfering transmissions from a TTF tag device). As has been discussed, such transmissions may include one or more of transmissions to detect and/or identify RR tag devices, transmissions of an anti-collision protocol to resolve collisions among transmissions of multiple RR tag devices, transmissions to exchange payload data (e.g., the data 233), etc.

However, if a transmission is received during the predetermined period of time from a TTF tag device, then the timing of at least the sleep pauses of transmissions of that TTF tag device are analyzed at 2150. Following such analysis, the reading device restricts its exchanges of transmissions with one or more RR tag devices that may be within the close proximity to the antenna to occurring during the sleep pauses at 2160.

Figure 8:
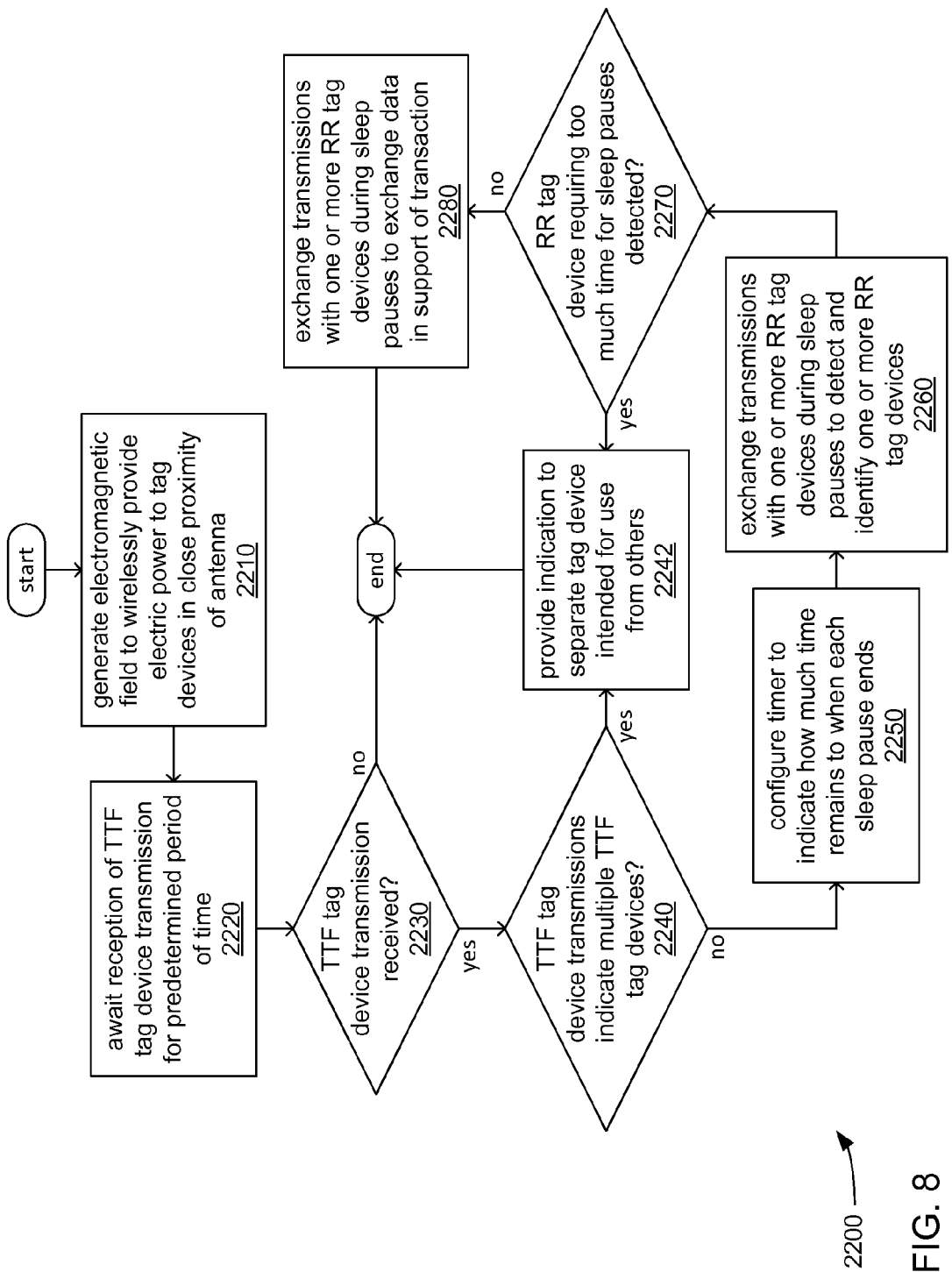

FIG. 8 illustrates an embodiment of a logic flow 2200. The logic flow 2200 may be representative of some or all of the operations executed by one or more embodiments described herein. More specifically, the logic flow 2200 may illustrate operations performed by the processor component 450 in executing at least the control routine 440, and/or performed by other component(s) of one of the reading devices 400. In particular, the logic flow 2200 is focused on operations to overcome the recurring transmissions of a single TTF tag device in greater detail.

At 2210, a processor component of a reading device (e.g., the processor component 450 of the reading device 400) operates an interface of the reading device (e.g., the interface 490) to generate an electromagnetic field to wirelessly provide electric power to tag devices in close proximity to an antenna of the reading device (e.g., the antenna 491). At 2220, the reading device waits for a predetermined period of time for any response from any TTF tag device (e.g., the TTF tag device 100) that may be within the close proximity to the antenna. At 2230, a check is made as to whether a transmission has been received of the type expected from a TTF tag device during the predetermined period of time.

If at least one TTF tag transmission is received, then a check is made at 2240 as to whether transmissions from more than one TTF tag device were received during the predetermined period of time. If so, then an indication may be provided to an operator of the reading device at 2242 requesting the operator to separate the tag device they intend to use with the reading device from other tag devices.

If transmission(s) from only TTF tag device were received during the predetermined period of time, then aspects of the timings of the transmissions of the one TTF tag device are analyzed and a timer is configured to provide indications of how much time remains during each sleep pause at 2250. As previously discussed, such indications of how much time remains may be employed by the processor component in determining whether there is sufficient time remaining during a current sleep pause to both transmit a request for a response from a RR tag device (e.g., one of the RR tag devices 200) and receive the response transmitted by that RR tag device. If not, then the processor component may wait until the next sleep pause to effect that exchange of transmissions.

At 2260, the processor component engages in exchanges of transmissions with one or more RR tag devices during such sleep pauses. As has been discussed, such transmissions may include one or more of transmissions to detect and/or identify RR tag devices, transmissions of an anti-collision protocol to resolve collisions among transmissions of multiple RR tag devices, transmissions to exchange payload data (e.g., the data 233), etc.

At 2270, a check is made as to whether a detected RR tag device employs a type of NFC in which it is not possible for at least some exchanges of transmissions between it and the reading device to be successfully completed during any sleep pause between two consecutive transmissions by the TTF tag device. As has been discussed, a type of NFC may be employed in which the combination of the time required for the reading device to transmit a request for a response and the time required for a RR tag device to transmit the expected response is simply too long to fit within any sleep pause. If there is such a RR tag device present within the close proximity to the antenna, then an indication may be provided to the operator of the reading device at 2242 requesting the operator to separate the tag device they intend to use with the reading device from other tag devices.

If no such RR tag device is present, then the reading device exchanges transmissions with one or more of the RR tag devices present within the close proximity during sleep pauses to exchange data in support of a transaction at 2280. As has been explained, the transaction so supported may be any of a variety of types of transaction, including and not limited to, a financial transaction, a monetary transaction, a verification transaction, etc.

Figure 9:
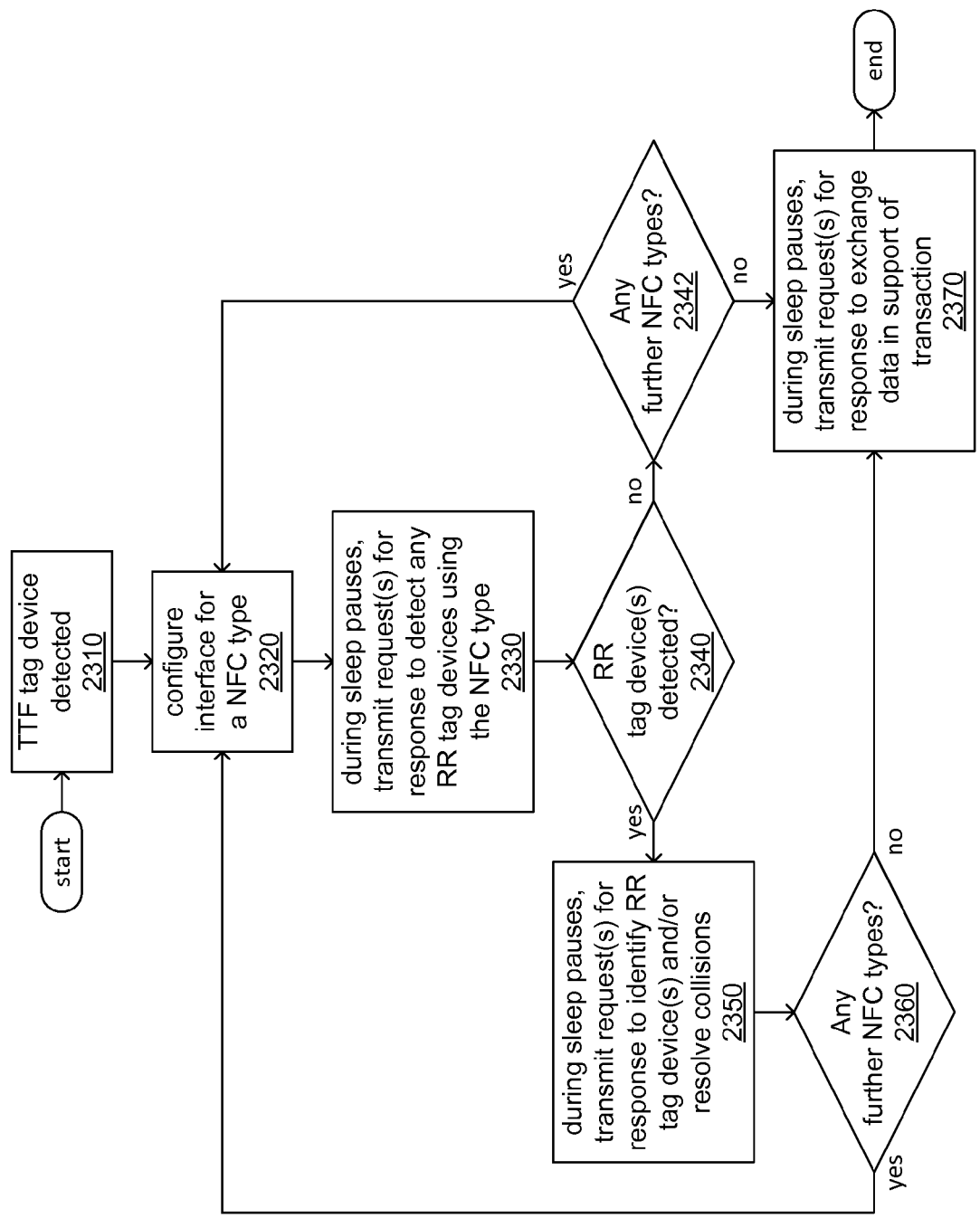

FIG. 9 illustrates an embodiment of a logic flow 2300. The logic flow 2300 may be representative of some or all of the operations executed by one or more embodiments described herein. More specifically, the logic flow 2300 may illustrate operations performed by the processor component 450 in executing at least the control routine 440, and/or performed by other component(s) of one of the reading devices 400. In particular, the logic flow 2300 is focused on operations to detect and identify RR tag devices of more than one NFC type during sleep pauses between consecutive transmissions of a single TTF tag device in greater detail.

At 2310, a processor component of a reading device (e.g., the processor component 450 of the reading device 400) has detected a TTF tag device (e.g., the TTF tag device 100). The processor component may have done so in the manner depicted in and described with respect to logic flow 2200 of FIG. 8.

At 2320, the processor component configures an interface of the reading device for a particular NFC type (e.g., one of the NFC types promulgated by the NFC Forum). At 2330, the processor component operates the interface to transmit one or more requests for responses from any RR tag devices (e.g., one or more of the RR tag devices 200) that may be within a short distance from an antenna of the reading device (e.g., the antenna 491) and that use the NFC type for which the interface is configured in order to detect such RR tag devices.

At 2340, a check is made as to whether any of such RR tag devices are detected. More precisely, a check is made as to whether there has been any response to the one or more requests for a response transmitted by the reading device.

If, at 2340, there has been no such response such that there are no RR tag devices are detected as present that are within the short distance from the antenna and that use that NFC type, then at 2342, a check is made as to whether there are any more NFC types for which efforts are to be made to detect RR tag devices. If there are more NFC types, then the processor component configures the interface for another NFC type at 2320. However, if at 2342, there are no more NFC types for which efforts are to be made to detect RR tag devices, then one or more requests are transmitted at 2370 for whatever RR tag devices have been detected using whatever NFC type to respond as part of exchanging payload data (e.g., the data 233) in support of a transaction.

However, if at 2340, there has been one or more responses such that there are one or more RR tag devices detected within the short distance from the antenna and that use that NFC type, then at 2350, the reading device transmits further requests for responses to those RR tag devices to identify individual one(s) of those RR tag devices and/or to engage in an anti-collision protocol to resolve collisions in transmission between multiple ones of those RR tag devices. Following such identification and/or resolution of collisions between RR tag devices using that NFC type, at 2360, a check is made as to whether there are any more NFC types for which efforts are to be made to detect RR tag devices. If there are more NFC types, then the processor component configures the interface for another NFC type at 2320. However, if at 2360, there are no more NFC types for which efforts are to be made to detect RR tag devices, then one or more requests are transmitted at 2370 for whatever RR tag devices have been detected using whatever NFC type to respond as part of exchanging payload data in support of a transaction.

Figure 10:
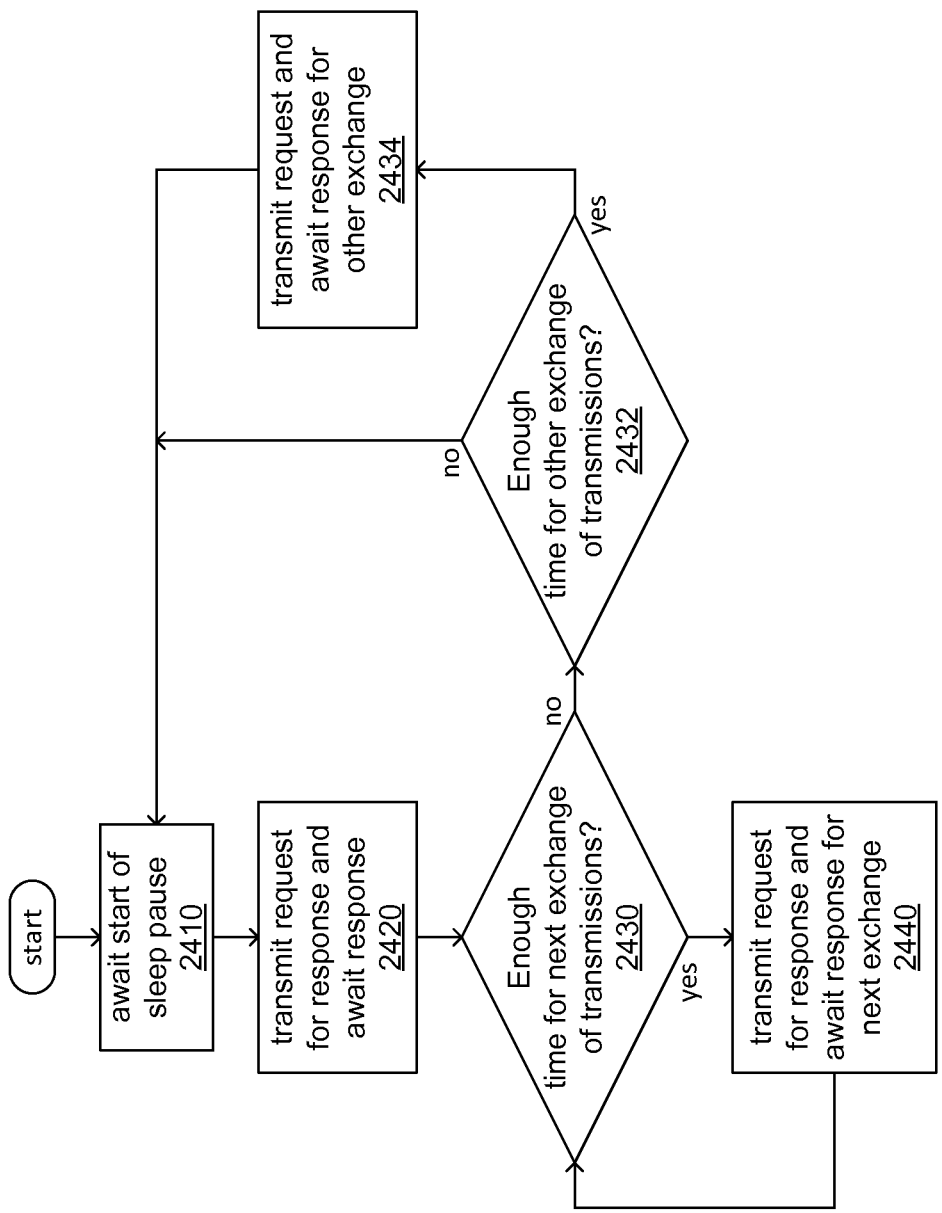

FIG. 10 illustrates an embodiment of a logic flow 2400. The logic flow 2400 may be representative of some or all of the operations executed by one or more embodiments described herein. More specifically, the logic flow 2400 may illustrate operations performed by the processor component 450 in executing at least the control routine 440, and/or performed by other component(s) of one of the reading devices 400. In particular, the logic flow 2400 is focused on operations to exchange transmissions with one or more RR tag devices during sleep pauses between consecutive transmissions of a single TTF tag device in greater detail.

At 2410, a processor component of a reading device (e.g., the processor component 450 of the reading device 400) awaits the start of a sleep pause. As has been discussed, the processor component may operate an interface to monitor a transmission of a TTF tag device (e.g., the TTF tag device 100) to detect the end of its transmission as a way to determine when a sleep pause begins, or the processor component may receive an indication from a timer that a sleep pause has begun.

At 2420, the processor component operates the interface to transmit a request for a response and waits for that response to be transmitted by a RR tag device (e.g., one or more of the RR tag devices 200). The transmitted request for a response and the response thereto (if there is one) may be an exchange of transmissions performed to detect a RR tag device, identify a RR tag device, resolve collisions in transmission among two or more RR tag devices, exchange payload data with a RR tag device, etc.

At 2430, following the exchange of transmissions at 2420, a check is made as to whether there is enough time remaining in the current sleep pause for a next exchange of transmissions planned to take place. If there is enough time, then that next exchange of transmissions occurs at 2440. More precisely, at 2440, the processor component operates the interface to transmit a next request for a response and waits for the response to that next request to be transmitted by a RR tag device. Following that next exchange of transmissions at 2440, the check at 2430 is repeated.

However, if at 2430, there isn't sufficient time remaining to perform the next exchange of transmissions, then at 2432, a check is made as to whether there is sufficient time remaining for another exchange of transmissions. As has been explained, the processor component of the reading device may reorder the order of exchanges of transmissions to be performed with RR tag devices to make use of time remaining during a sleep pause to perform an exchange of transmissions that can be successfully completed during that remaining time.

If, at 2432, there is enough time for another exchange of transmissions, then that other exchange of transmissions occurs at 2434. However, if at 2432, there isn't sufficient time remaining to perform another exchange of transmissions, then the processor component awaits the start of the next sleep pause at 2410.

Figure 11:
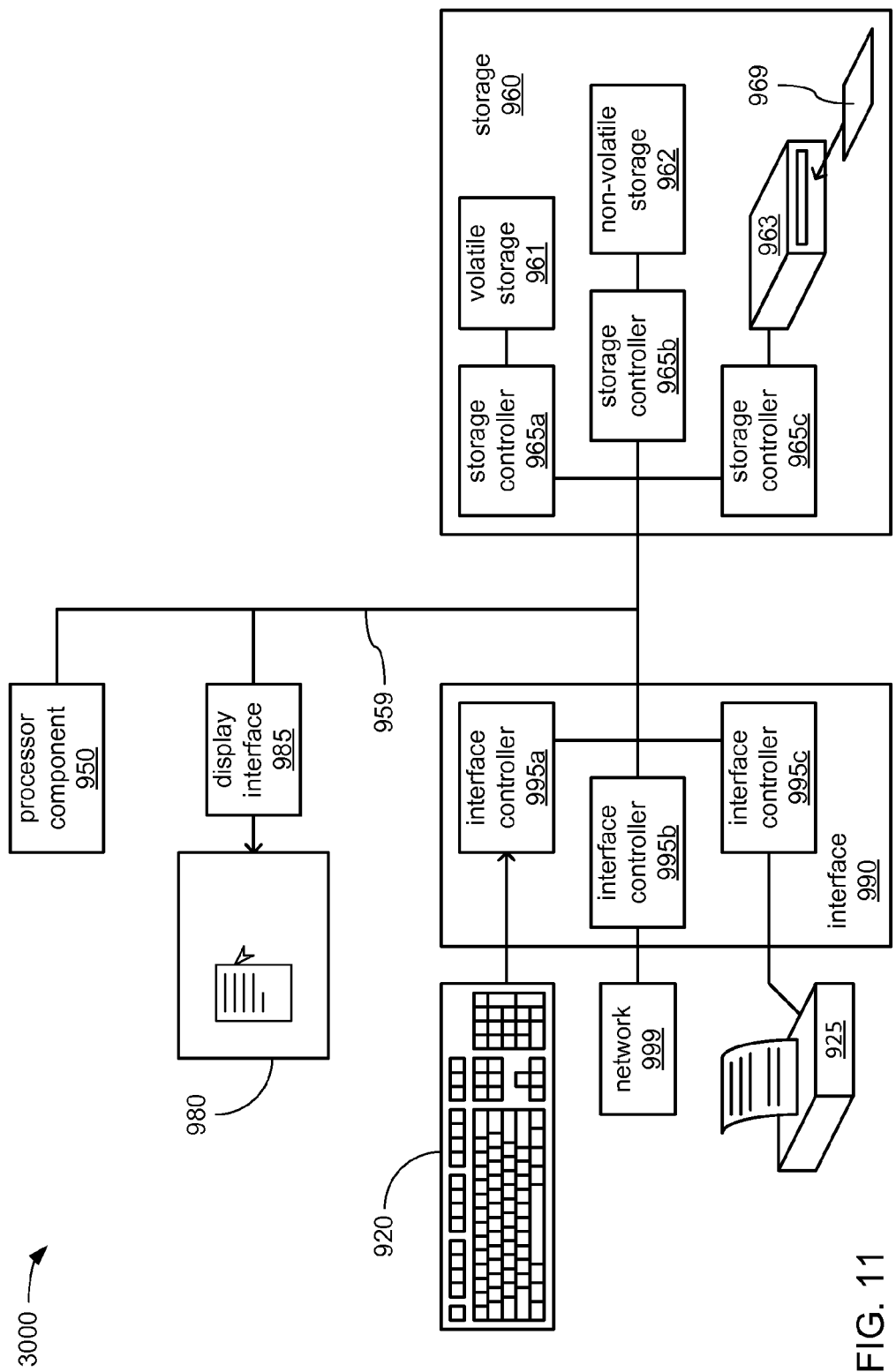
FIG. 11 illustrates a processing architecture according to an embodiment.

FIG. 11 illustrates an embodiment of an exemplary processing architecture 3000 suitable for implementing various embodiments as previously described. More specifically, the processing architecture 3000 (or variants thereof) may be implemented as part of one or more of the computing devices 400, 500 or 700, and/or as part of one or both of the tag devices 100 or 200. It should be noted that components of the processing architecture 3000 are given reference numbers in which the last two digits correspond to the last two digits of reference numbers of at least some of the components earlier depicted and described as part of the computing devices 100, 300, 500 and 700, as well as the controller 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, a software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 959, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which signals are optically and/or electrically conveyed. Further, at least portions of couplings 959 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 450 and 550, and may correspond to controllers 150 and 250) may include any of a wide variety of commercially available processors, employing any of a wide variety of technologies and implemented with one or more cores physically combined in any of a number of ways.

As previously discussed, the storage 960 (corresponding to the storages 160, 560, 660 and 760) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 959 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interfaces 190, 290, 490 or 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). More specifically, the interface controller 995b may incorporate one or more radio frequency (RF) transceivers and/or may be coupled to one or more antennae 991 (which may be incorporated into a portion of the interface 990) to exchange RF wireless signals with antenna(e) of one or more other devices as part of wireless communications on the depicted network 999. The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, a microphone to monitor sounds of persons to accept commands and/or data signaled by those persons via voice or other sounds they may make, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In Example 1, an apparatus to communicate with tag devices via near field communications (NFC) includes a processor component; a timing component for execution by the processor component to determine an amount of time remaining in a current sleep pause between two consecutive transmissions of a Tag-Talks-First (TTF) tag device; and a communications component for execution by the processor component to determine whether the amount of time remaining in the current sleep pause is sufficient to transmit a request for response to a Response-Request (RR) tag device and receive a response to the request from the RR tag device, and to transmit the request based on the amount of time remaining in the current sleep pause.

In Example 2, which includes the subject matter of Example 1, the apparatus may include an antenna, an interface coupling the antenna to the processor component, and a power transmission component for execution by the processor component to operate the interface to generate an electromagnetic field in a vicinity of the antenna to wirelessly provide electric power to at least one of the TTF tag device or the RR tag device.

In Example 3, which includes the subject matter of any of Examples 1-2, the apparatus may include a TTF detection component for execution by the processor component to operate the interface to await reception of a transmission of the TTF tag device for a predetermined period of time following commencement of generating the electromagnetic field, to determine whether a transmission received during the predetermined period of time has at least one characteristic of a transmission from a TTF tag device, and to determine whether the TTF tag device is present in the vicinity of the antenna based on receiving the transmission during the predetermined period of time and the transmission having the at least one characteristic, the at least one characteristic comprising at least one of an expected encoding, an expected bitrate, an expected length in bits or an expected error checking mechanism.

In Example 4, which includes the subject matter of any of Examples 1-3, the TTF detection component may determine whether there is another TTF tag device in the vicinity of the antenna, and the apparatus may include a TTF anti-collision component to present a request to separate a tag device to use in support of a transaction from multiple tag devices, the multiple tag devices comprising the TTF tag device and the other TTF tag device.

In Example 5, which includes the subject matter of any of Examples 1-4, the apparatus may include a RR detection component for execution by the processor component to transmit the request for response, to determine whether the response to the request has at least one characteristic of a transmission from a RR tag device, and to determine whether the RR tag device is present based on the response to the request having the at least one characteristic, the at least one characteristic comprising at least one of an expected encoding, an expected bitrate, an expected length in bits, or an expected error checking mechanism.

In Example 6, which includes the subject matter of any of Examples 1-5, the RR detection component may determine whether the RR tag device uses a type of NFC in which there is insufficient time available in any sleep pause between consecutive transmissions of the TTF tag device to transmit the request for response and to receive the response, and the apparatus may include a user interface component to present a request to separate a tag device to use in support of a transaction from multiple tag devices based on the insufficiency of time available in any sleep pause, the multiple tag devices comprising the TTF tag device and the RR tag device.

In Example 7, which includes the subject matter of any of Examples 1-6, the apparatus may include a RR identification component for execution by the processor component to transmit the request for response and to identify the RR tag device based on an identification (ID) data in the response.

In Example 8, which includes the subject matter of any of Examples 1-7, the apparatus may include a RR anti-collision component for execution by the processor component to transmit the request for response as part of an anti-collision protocol to resolve a collision in transmissions between the RR tag device and another RR tag device.

In Example 9, which includes the subject matter of any of Examples 1-8, the communications component may determine whether the amount of time remaining in the current sleep pause is sufficient to transmit a next request for response following receipt of the response and receive a response to the next request, and may transmit the next request based on the amount of time remaining in the current sleep pause.

In Example 10, which includes the subject matter of any of Examples 1-9, the communications component may determine whether the amount of time remaining in the current sleep pause is sufficient to transmit another request for response following receipt of the response in lieu of the next request and receive a response to the other request, and may transmit the other request based on the amount of time remaining in the current sleep pause and in response to the amount of time remaining in the current sleep pause being insufficient for transmitting the next request and receiving the response to the next request.

In Example 11, an apparatus to communicate with tag devices via near field communications (NFC) includes an antenna, a processor component, an interface coupling the processor component to the antenna to enable NFC, a power transmission component for execution by the processor component to operate the interface to generate an electromagnetic field in a vicinity of the antenna to wirelessly provide electric power to at least one of a Tag-Talks-First {TTF} tag device or a Response-Request (RR) tag device, a timing component for execution by the processor component to determine when a sleep pause between two consecutive transmissions of the TTF tag device begins, and a RR detection component to transmit a request for response when the sleep pause begins to detect the RR tag device.

In Example 12, which includes the subject matter of Example 11, the apparatus may include a TTF detection component for execution by the processor component to operate the interface to await reception of a transmission of the TTF tag device for a predetermined period of time following commencement of generating the electromagnetic field, to determine whether a transmission received during the predetermined period of time has at least one characteristic of a transmission from a TTF tag device, and to determine whether the TTF tag device is present in the vicinity of the antenna based on receiving the transmission during the predetermined period of time and the transmission having the at least one characteristic, the at least one characteristic comprising at least one of an expected encoding, an expected bitrate, an expected length in bits or an expected error checking mechanism.

In Example 13, which includes the subject matter of any of Examples 11-12, the TTF detection component may determine whether there is another TTF tag device in the vicinity of the antenna, the apparatus comprising a TTF anti-collision component to present a request to separate a tag device to use in support of a transaction from multiple tag devices, the multiple tag devices comprising the TTF tag device and the other TTF tag device.

In Example 14, which includes the subject matter of any of Examples 11-13, the RR detection component may transmit the request for response, to determine whether a response to the request has at least one characteristic of a transmission from a RR tag device, and may determine whether the RR tag device is present based on the response to the request having the at least one characteristic, the at least one characteristic comprising at least one of an expected encoding, an expected bitrate, an expected length in bits, or an expected error checking mechanism.

In Example 15, which includes the subject matter of any of Examples 11-14, the RR detection component may determine whether the RR tag device uses a type of NFC in which there is insufficient time available in any sleep pause between consecutive transmissions of the TTF tag device to transmit the request for response and to receive a response, and the apparatus may include a user interface component to present a request to separate a tag device to use in support of a transaction from multiple tag devices based on the insufficiency of time available in any sleep pause, the multiple tag devices comprising the TTF tag device and the RR tag device.

In Example 16, which includes the subject matter of any of Examples 11-15, the apparatus may include a RR identification component for execution by the processor component to transmit another request for response and to identify the RR tag device based on an identification (ID) data in a response to the other request.

In Example 17, which includes the subject matter of any of Examples 11-16, the apparatus may include a RR anti-collision component for execution by the processor component to transmit another request for response as part of an anti-collision protocol to resolve a collision in transmissions between the RR tag device and another RR tag device.

In Example 18, which includes the subject matter of any of Examples 11-17, the communications component may determine whether the amount of time remaining in the current sleep pause is sufficient to transmit a next request for response following receipt of a response to the request and receive a response to the next request, and to transmit the next request based on the amount of time remaining in the current sleep pause.

In Example 19, which includes the subject matter of any of Examples 11-18, the communications component may determine whether the amount of time remaining in the current sleep pause is sufficient to transmit another request for response following receipt of the response and receive a response to the other request, and may transmit the other request based on the amount of time remaining in the current sleep pause and in response to the amount of time remaining in the current sleep pause being insufficient for transmitting the next request and receiving the response to the next request.

In Example 20, a computing-implemented method for communicating with tag devices via near field communications (NFC) includes determining an amount of time remaining in a current sleep pause between two consecutive transmissions of a Tag-Talks-First (TTF) tag device, determining whether the amount of time remaining in the current sleep pause is sufficient to transmit a request for response to a response-request (RR) tag device and receive a response to the request from the RR tag device, and transmitting the request based on the amount of time remaining in the current sleep pause.

In Example 21, which includes the subject matter of Example 20, the method may include generating an electromagnetic field in a vicinity of an antenna to wirelessly provide electric power to at least one of the TTF tag device or the RR tag device.

In Example 22, which includes the subject matter of any of Examples 20-21, the method may include awaiting reception of a transmission of the TTF tag device for a predetermined period of time following commencement of generating the electromagnetic field, determining whether a transmission received during the predetermined period of time has at least one characteristic of a transmission from a TTF tag device, the at least one characteristic comprising at least one of an expected encoding, an expected bitrate, an expected length in bits or an expected error checking mechanism, and determining whether the TTF tag device is present in the vicinity of the antenna based on receiving the transmission during the predetermined period of time and the transmission having the at least one characteristic.

In Example 23, which includes the subject matter of any of Examples 20-22, the method may include determining whether there is another TTF tag device in the vicinity of the antenna, and presenting a request to separate a tag device to use in support of a transaction from multiple tag devices, the multiple tag devices comprising the TTF tag device and the other TTF tag device.

In Example 24, which includes the subject matter of any of Examples 20-23, the method may include determining whether the response to the request has at least one characteristic of a transmission from a RR tag device, the at least one characteristic comprising at least one of an expected encoding, an expected bitrate, an expected length in bits, or an expected error checking mechanism, and determining whether the RR tag device is present in the vicinity of the antenna based on the response to the request having the at least one characteristic.

In Example 25, which includes the subject matter of any of Examples 20-24, the method may include determining whether the RR tag device uses a type of NFC in which there is insufficient time available in any sleep pause between consecutive transmissions of the TTF tag device to transmit the request for response and to receive the response, and presenting a request to separate a tag device to use in support of a transaction from multiple tag devices based on the insufficiency of time available in any sleep pause, the multiple tag devices comprising the TTF tag device and the RR tag device.

In Example 26, which includes the subject matter of any of Examples 20-25, the method may include identifying the RR tag device based on an identification (ID) data in the response.

In Example 27, which includes the subject matter of any of Examples 20-26, the method may include transmitting the request for response as part of an anti-collision protocol to resolve a collision in transmissions between the RR tag device and another RR tag device.

In Example 28, which includes the subject matter of any of Examples 20-27, the method may include comprising determining whether the amount of time remaining in the current sleep pause is sufficient to transmit a next request for response following receipt of the response and receive a response to the next request, and transmitting the next request based on the amount of time remaining in the current sleep pause.

In Example 29, which includes the subject matter of any of Examples 20-28, the method may include determining whether the amount of time remaining in the current sleep pause is sufficient to transmit another request for response following receipt of the response in lieu of the next request and receive a response to the other request; and transmitting the other request based on the amount of time remaining in the current sleep pause and in response to the amount of time remaining in the current sleep pause being insufficient for transmitting the next request and receiving the response to the next request.

In Example 30, at least one machine-readable storage medium includes instructions that when executed by a computing device, cause the computing device to determine an amount of time remaining in a current sleep pause between two consecutive transmissions of a Tag-Talks-First (TTF) tag device, determine whether the amount of time remaining in the current sleep pause is sufficient to transmit a request for response to a Response-Request (RR) tag device and receive a response to the request from the RR tag device, and transmit the request based on the amount of time remaining in the current sleep pause.

In Example 31, which includes the subject matter of Example 30, the computing device may be caused to generate an electromagnetic field in a vicinity of an antenna to wirelessly provide electric power to at least one of the TTF tag device or the RR tag device.

In Example 32, which includes the subject matter of any of Examples 30-31, the computing device may be caused to await reception of a transmission of the TTF tag device for a predetermined period of time following commencement of generating the electromagnetic field, determine whether a transmission received during the predetermined period of time has at least one characteristic of a transmission from a TTF tag device, the at least one characteristic comprising at least one of an expected encoding, an expected bitrate, an expected length in bits or an expected error checking mechanism, and determine whether the TTF tag device is present in the vicinity of the antenna based on receiving the transmission during the predetermined period of time and the transmission having the at least one characteristic.

In Example 33, which includes the subject matter of any of Examples 30-32, the computing device may be caused to determine whether there is another TTF tag device in the vicinity of the antenna, and present a request to separate a tag device to use in support of a transaction from multiple tag devices, the multiple tag devices comprising the TTF tag device and the other TTF tag device.

In Example 34, which includes the subject matter of any of Examples 30-33, the computing device may be caused to determine whether the response to the request has at least one characteristic of a transmission from a RR tag device, the at least one characteristic comprising at least one of an expected encoding, an expected bitrate, an expected length in bits, or an expected error checking mechanism; and determine whether the RR tag device is present in the vicinity of the antenna based on the response to the request having the at least one characteristic.

In Example 35, which includes the subject matter of any of Examples 30-34, the computing device may be caused to determine whether the RR tag device uses a type of NFC in which there is insufficient time available in any sleep pause between consecutive transmissions of the TTF tag device to transmit the request for response and to receive the response; and present a request to separate a tag device to use in support of a transaction from multiple tag devices based on the insufficiency of time available in any sleep pause, the multiple tag devices comprising the TTF tag device and the RR tag device.

In Example 36, which includes the subject matter of any of Examples 30-35, the computing device may be caused to identify the RR tag device based on an identification (ID) data in the response.

In Example 37, which includes the subject matter of any of Examples 30-36, the computing device may be caused to transmit the request for response as part of an anti-collision protocol to resolve a collision in transmissions between the RR tag device and another RR tag device.

In Example 38, which includes the subject matter of any of Examples 30-37, the computing device may be caused to determine whether the amount of time remaining in the current sleep pause is sufficient to transmit a next request for response following receipt of the response and receive a response to the next request, and transmit the next request based on the amount of time remaining in the current sleep pause.

In Example 39, which includes the subject matter of any of Examples 30-38, the computing device may be caused to determine whether the amount of time remaining in the current sleep pause is sufficient to transmit another request for response following receipt of the response in lieu of the next request and receive a response to the other request, and transmit the other request based on the amount of time remaining in the current sleep pause and in response to the amount of time remaining in the current sleep pause being insufficient for transmitting the next request and receiving the response to the next request.

In Example 40, at least one machine-readable storage medium may include instructions that when executed by a computing device, cause the computing device to perform any of the above.

In Example 41, an apparatus to communicate with tag devices via near field communications (NFC) may include means for performing any of the above.

The invention claimed is:

1. An apparatus to communicate with tag devices via near field communications (NFC) comprising:
 a processor component;
 a timing component for execution by the processor component to determine an amount of time remaining in a current sleep pause between two consecutive transmissions of a Tag-Talks-First (TTF) tag device; and
 a communications component for execution by the processor component to:
  determine whether the amount of time remaining in the current sleep pause is sufficient to transmit a request for response to a Response-Request (RR) tag device and receive a response to the request from the RR tag device,
  in response to determining that the amount of time remaining in the current sleep pause is sufficient, transmit the request based on the amount of time remaining in the current sleep pause, and
  in response to determining that the amount of time remaining in the current sleep pause is insufficient, reorder an ordering of requests for response to cause a different request for response to be transmitted to a different RR tag device and transmit the different request if the amount of time remaining is sufficient to transmit the different request and receive a response to the different request from the different RR tag device.

2. The apparatus of claim 1, comprising:
 an antenna;
 an interface coupling the antenna to the processor component; and
 a power transmission component for execution by the processor component to operate the interface to generate an electromagnetic field in a vicinity of the antenna to wirelessly provide electric power to at least one of the TTF tag device or the RR tag device.

3. The apparatus of claim 2, comprising a TTF detection component for execution by the processor component to operate the interface to await reception of a transmission of the TTF tag device for a predetermined period of time following commencement of generating the electromagnetic field, to determine whether a transmission received during the predetermined period of time has at least one characteristic of a transmission from a TTF tag device, and to determine whether the TTF tag device is present in the vicinity of the antenna based on receiving the transmission during the predetermined period of time and the transmission having the at least one characteristic, the at least one characteristic comprising at least one of an expected encoding, an expected bitrate, an expected length in bits or an expected error checking mechanism.

4. The apparatus of claim 1, comprising a RR detection component for execution by the processor component to transmit the request for response, to determine whether the response to the request has at least one characteristic of a transmission from a RR tag device, and to determine whether the RR tag device is present based on the response to the request having the at least one characteristic, the at least one characteristic comprising at least one of an expected encoding, an expected bitrate, an expected length in bits, or an expected error checking mechanism.

5. The apparatus of claim 4, the RR detection component to determine whether the RR tag device uses a type of NFC in which there is insufficient time available in any sleep pause between consecutive transmissions of the TTF tag device to transmit the request for response and to receive the response, the apparatus comprising a user interface component to present a request to separate a tag device to use in support of a transaction from multiple tag devices based on the insufficiency of time available in any sleep pause, the multiple tag devices comprising the TTF tag device and the RR tag device.

6. The apparatus of claim 1, the communications component to determine whether the amount of time remaining in the current sleep pause is sufficient to transmit a next request for response following receipt of the response and receive a response to the next request, and to transmit the next request based on the amount of time remaining in the current sleep pause.

7. The apparatus of claim 6, the communications component to determine whether the amount of time remaining in the current sleep pause is sufficient to transmit another request for response following receipt of the response in lieu of the next request and receive a response to the other request, and to transmit the other request based on the amount of time remaining in the current sleep pause and in response to the amount of time remaining in the current sleep pause being insufficient for transmitting the next request and receiving the response to the next request.

8. A computer-implemented method for communicating with tag devices via near field communications (NFC) comprising:

determining an amount of time remaining in a current sleep pause between two consecutive transmissions of a Tag-Talks-First (TTF) tag device;

determining whether the amount of time remaining in the current sleep pause is sufficient to transmit a request for response to a Response-Request (RR) tag device and receive a response to the request from the RR tag device;

transmitting, in response to determining the amount of time remaining in the current sleep pause is sufficient, the request based on the amount of time remaining in the current sleep pause; and reordering, in response to determining the amount of time remaining in current pause is insufficient, an ordering of requests for response to cause a different response to be transmitted to a different RR tag device.

9. The computer-implemented method of claim 8, the method comprising generating an electromagnetic field in a vicinity of an antenna to wirelessly provide electric power to at least one of the TTF tag device or the RR tag device.

10. The computer-implemented method of claim 9, the method comprising:

awaiting reception of a transmission of the TTF tag device for a predetermined period of time following commencement of generating the electromagnetic field;

determining whether a transmission received during the predetermined period of time has at least one characteristic of a transmission from a TTF tag device, the at least one characteristic comprising at least one of an expected encoding, an expected bitrate, an expected length in bits or an expected error checking mechanism; and determining whether the TTF tag device is present in the vicinity of the antenna based on receiving the transmission during the predetermined period of time and the transmission having the at least one characteristic.

11. The computer-implemented method of claim 9, the method comprising:

determining whether the response to the request has at least one characteristic of a transmission from a RR tag device, the at least one characteristic comprising at least one of an expected encoding, an expected bitrate, an expected length in bits, or an expected error checking mechanism; and determining whether the RR tag device is present in the vicinity of the antenna based on the response to the request having the at least one characteristic.

12. The computer-implemented method of claim 11, the method comprising:

determining whether the RR tag device uses a type of NFC in which there is insufficient time available in any sleep pause between consecutive transmissions of the TTF tag device to transmit the request for response and to receive the response; and presenting a request to separate a tag device to use in support of a transaction from multiple tag devices based on the insufficiency of time available in any sleep pause, the multiple tag devices comprising the TTF tag device and the RR tag device.

13. The computer-implemented method of claim 8, the method comprising:

determining whether the amount of time remaining in the current sleep pause is sufficient to transmit a next request for response following receipt of the response and receive a response to the next request; and transmitting the next request based on the amount of time remaining in the current sleep pause.

14. The computer-implemented method of claim 13, the method comprising:

determining whether the amount of time remaining in the current sleep pause is sufficient to transmit another request for response following receipt of the response in lieu of the next request and receive a response to the other request; and transmitting the other request based on the amount of time remaining in the current sleep pause and in response to the amount of time remaining in the current sleep pause being insufficient for transmitting the next request and receiving the response to the next request.

15. At least one non-transitory machine-readable storage medium comprising instructions that when executed by a computing device, cause the computing device to:

determine an amount of time remaining in a current sleep pause between two consecutive transmissions of a Tag-Talks-First (TTF) tag device;

determine whether the amount of time remaining in the current sleep pause is sufficient to transmit a request for response to a Response-Request (RR) tag device and receive a response to the request from the RR tag device;

transmit, in response to determining the amount of time remaining in the current sleep pause is sufficient, the request based on the amount of time remaining in the current sleep pause; and reordering, in response to determining the amount of time remaining in the current pause is insufficient, an ordering of requests for response to cause a different response to be transmitted to a different RR tag device.

16. The at least one non-transitory machine-readable storage medium of claim 15, the computing device caused to generate an electromagnetic field in a vicinity of an antenna to wirelessly provide electric power to at least one of the TTF tag device or the RR tag device.

17. The at least one non-transitory machine-readable storage medium of claim 16, the computing device caused to:

await reception of a transmission of the TTF tag device for a predetermined period of time following commencement of generating the electromagnetic field;

determine whether a transmission received during the predetermined period of time has at least one characteristic of a transmission from a TTF tag device, the at least one characteristic comprising at least one of an expected encoding, an expected bitrate, an expected length in bits or an expected error checking mechanism; and determine whether the TTF tag device is present in the vicinity of the antenna based on receiving the transmission during the predetermined period of time and the transmission having the at least one characteristic.

18. The at least one non-transitory machine-readable storage medium of claim 17, the computing device caused to:

determine whether there is another TTF tag device in the vicinity of the antenna; and present a request to separate a tag device to use in support of a transaction from multiple tag devices, the multiple tag devices comprising the TTF tag device and the other TTF tag device.

19. The at least one non-transitory machine-readable storage medium of claim 15, the computing device caused to identify the RR tag device based on an identification (ID) data in the response.

20. The at least one non-transitory machine-readable storage medium of claim 15, the computing device caused to transmit the request for response as part of an anti-collision protocol to resolve a collision in transmissions between the RR tag device and another RR tag device.

\* \* \* \* \*